(12) United States Patent
Iihoshi et al.

(10) Patent No.: US 9,942,823 B2
(45) Date of Patent: Apr. 10, 2018

(54) COMMUNICATION TERMINAL, COMMUNICATION METHOD, AND COMMUNICATION PROGRAM

(71) Applicant: NEC Corporation, Minato-ku, Tokyo (JP)

(72) Inventors: Takahiro Iihoshi, Tokyo (JP); Yoshikazu Watanabe, Tokyo (JP); Shuichi Karino, Tokyo (JP); Gen Morita, Tokyo (JP); Yoshinori Saida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/038,793

(22) PCT Filed: Nov. 4, 2014

(86) PCT No.: PCT/JP2014/005543
§ 371 (c)(1),
(2) Date: May 24, 2016

(87) PCT Pub. No.: WO2015/083320
PCT Pub. Date: Jun. 11, 2015

(65) Prior Publication Data
US 2017/0164262 A1 Jun. 8, 2017

(30) Foreign Application Priority Data
Dec. 6, 2013 (JP) .................................. 2013-252663

(51) Int. Cl.
*H04L 12/741* (2013.01)
*H04W 40/02* (2009.01)
(Continued)

(52) U.S. Cl.
CPC ........... *H04W 40/02* (2013.01); *H04L 12/189* (2013.01); *H04L 45/72* (2013.01); *H04L 45/745* (2013.01); *H04L 61/106* (2013.01)

(58) Field of Classification Search
CPC ...... H04W 40/02; H04L 45/72; H04L 61/106; H04L 12/189; H04L 45/745
See application file for complete search history.

(56) References Cited

U.S. PATENT DOCUMENTS

2014/0254595 A1* 9/2014 Luo ....................... H04W 40/22
370/392

FOREIGN PATENT DOCUMENTS

JP H05-268194 A 10/1993
JP 2001-136178 A 5/2001
(Continued)

OTHER PUBLICATIONS

JP2010-114774A (English Translation). Translated Jul. 6, 2017. [online], [retrieved on Jul. 6, 2017], Retrieved from the Internet <URL: https://dossier1.j-platpat.inpit.go.jp/tri/all/odse/ODSE_GM101_Submit.action>.*
(Continued)

*Primary Examiner* — Omar Ghowrwal

(57) ABSTRACT

To provide a communication terminal capable of selecting a communication interface corresponding to a communicable wireless network without the use of a route determination dedicated packet. A packet generation means 93 generates a packet based on data for receiving a service from a destination device. A control means 94 selects a communication interface 91 from among a plurality of communication interfaces 91, instructs a packet processing means 95 to send a packet generated by the packet generation means 93 to the communication interface 91, and when a response packet for the packet is not input until a timeout determination reference time, selects a different communication interface 91

(Continued)

from the communication interface 91, instructs the packet processing means 95 to send a copy of the packet to the communication interface 91.

9 Claims, 19 Drawing Sheets

(51) Int. Cl.
*H04L 12/721* (2013.01)
*H04L 29/12* (2006.01)
*H04L 12/18* (2006.01)

(56) References Cited

FOREIGN PATENT DOCUMENTS

| | | | |
|---|---|---|---|
| JP | 2006-333336 | A | 12/2006 |
| JP | 2007-184836 | A | 7/2007 |
| JP | 2007-267407 | A | 10/2007 |
| JP | 2008-263520 | A | 10/2008 |
| JP | 2009-267847 | A | 11/2009 |
| JP | 2010-114774 | A | 5/2010 |
| WO | 2012/053049 | A1 | 4/2012 |

OTHER PUBLICATIONS

International Search Report for PCT Application No. PCT/JP2014/005543, dated Feb. 3, 2015.

* cited by examiner

COMMUNICATION TERMINAL, COMMUNICATION METHOD, AND COMMUNICATION PROGRAM

This application is a National Stage Entry of PCT/JP2014/005543 filed on Nov. 4, 2014, which claims priority from Japanese Patent Application 2013-252663 filed on Dec. 6, 2013, the contents of all of which are incorporated herein by reference, in their entirety.

TECHNICAL FIELD

The present invention relates to a communication terminal, a communication method, and a communication program, and particularly to a communication terminal capable of being connected to a plurality of wireless networks as well as a communication method and a communication program applied to the communication terminal.

BACKGROUND ART

Communication interfaces in a plurality of different wireless communication systems are mounted on a communication terminal such as cell phone or Smartphone. For example, a communication interface for wireless Local Area Network (LAN) and a communication interface for Long Term Evolution (LTE) may be mounted on a communication terminal.

Patent Literature 1 describes therein a route control method for transmitting a route search frame to a plurality of routes through which a transmission source device leads to a transmission destination, and determining a route through which the route search frame is earlier received at the transmission destination, a route with a less number of times of retry, or a route with less line loads thereby to determine a route to be used.

Patent Literature 2 describes therein a structure in which a base device and a remote device are provided, the base device transmits a group ID to which the remote device belongs and a unique ID of the remote device and detects the presence of a response signal from the remote device thereby to search a communication route. The group ID to which the remote device belongs and the unique ID of the remote device are input by an operator of the base device, for example.

Patent Literature 3 describes therein a communication device for transmitting a negotiation packet, and when a response for the negotiation packet is not received within a defined period of time, changing a communication condition.

CITATION LIST

Patent Literature

PTL 1: Japanese Patent Application Laid-Open No. 2001-136178 (Abstract and others)
PTL 2: Japanese Patent Application Laid-Open No. H5-268194 (Paragraphs [0025] to [0027], and others)
PTL 3: Japanese Patent Application Laid-Open No. 2007-184836 (paragraphs [0033] to [0036], and others)

SUMMARY OF INVENTION

Technical Problem

Particularly in the case of wireless LAN, even if a communication route is established, communication terminals may not actually make communication. In many cases, one of the causes is that congestion in radio channels in a wireless period between a wireless LAN access point and a communication terminal, or influences of radio interference may prohibit communication. That is, because of a deteriorated communication transmission quality of a wireless communication route, there occurs a phenomenon that a packet does not pass. At this time, if a user of the communication terminal is provided with a service via the wireless network, he/she cannot preferably receive the service.

With the technique described in Patent Literature 1, a route search frame is transmitted to a plurality of routes through which a transmission source device leads to a transmission destination, and communication transmission qualities of the wireless communication routes are measured thereby to determine a route to be used. The communication transmission qualities keep being measured by use of the route search frame in this way, and thus a packet can be transmitted to the destination almost accurately. With the technique described in Patent Literature 1, however, in addition to a packet including data to be transmitted to the destination in order the communication terminal to be provided with a service or the like, a route determination dedicated packet (route search frame) needs to be exchanged. There is therefore a problem that communication efficiency or power efficiency is deteriorated due to an exchanged route determination dedicated packet.

Exchange of "the group ID to which the remote device belongs and the unique ID of the remote device" with the technique described in Patent Literature 2 also corresponds to exchange of route determination dedicated data, and a similar problem to the above is caused. Exchange of a negotiation packet described in Patent Literature 3 is also similar thereto.

It is therefore an object of the present invention to provide a communication terminal capable of selecting a communication interface for a communicable wireless network without the use of a route determination dedicated packet, a communication method, and a communication program.

Solution to Problem

A communication terminal of the present invention includes: a plurality of communication interfaces each corresponding to at least one wireless network among a plurality of wireless networks; a packet generation means for generating a packet based on data for receiving a service from a destination device; a packet processing means for sending a packet to a designated communication interface; and a control means for selecting a communication interface from among the communication interfaces, instructing the packet processing means to send a packet generated by the packet generation means to the communication interface, and when a response packet for the packet is not input until a timeout determination reference time, selecting a different communication interface from the communication interface, instructing the packet processing means to send a copy of the packet to the communication interface.

Further, a communication method of the present invention applied to a communication terminal includes a plurality of communication interfaces each corresponding to at least one wireless network among a plurality of wireless networks, wherein a packet generation means generates a packet based on data for receiving a service from a destination device, a control means selects a communication interface from among the communication interfaces, instructs a packet processing means to send a packet generated by the packet generation means to the communication interface, and when a response packet for the packet is not input until a timeout determination reference time, selects a different communication interface from the communication interface, instructs the packet processing means to send a copy of the packet to the communication interface, and the packet processing means sends the packet to the communication interface selected by the control means in response to the instruction of the control means.

Further, a communication program of the present invention mounted on a computer includes communication interfaces each corresponding to at least one wireless network among a plurality of wireless networks, and a packet processing means for sending a packet to a designated communication interface, the program causes the computer to perform: a packet generation processing of generating a packet based on data for receiving a service from a destination device; and a control processing of instructing the packet processing means to select a communication interface from among the communication interfaces and to send a packet generated in the packet generation processing to the communication interface, and when a response packet for the packet is not input until a timeout determination reference time, instructing the packet processing means to select a different communication interface from the communication interface and to send a copy of the packet to the communication interface.

Advantageous Effects of Invention

According to the present invention, it is possible to select a communication interface for a communicable wireless network without the use of a route determination dedicated packet.

BRIEF DESCRIPTION OF DRAWINGS

FIG. 3 It depicts a flowchart illustrating an exemplary processing progress when packets can pass through a wireless network 2a.

FIG. 10 It depicts a flowchart illustrating an exemplary processing progress when packets can pass through the wireless network 2a.

DESCRIPTION OF EMBODIMENTS

Exemplary embodiments of the present invention will be described below with reference to the drawings.

First Exemplary Embodiment

Figure 1:
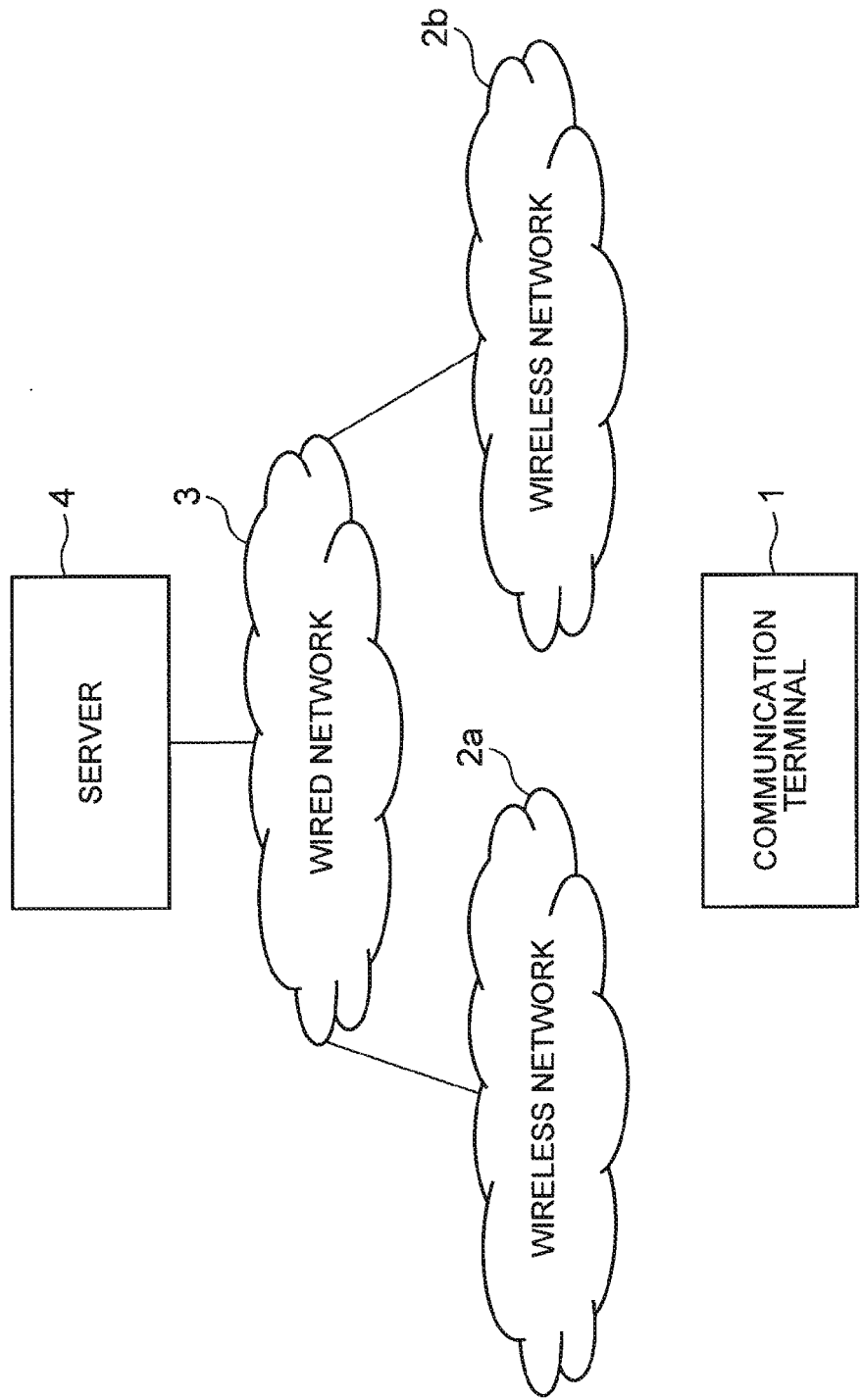
FIG. 1 It depicts a schematic diagram illustrating a communication system including a communication terminal according to a first exemplary embodiment of the present invention.

FIG. 1 is a schematic diagram illustrating a communication system including a communication terminal according to a first exemplary embodiment of the present invention. A server 4 illustrated in FIG. 1 exchanges packets with a communication terminal 1 according to the present invention thereby to provide predetermined services. The contents of the services are not particularly limited. A plurality of servers 4 may be present.

The communication terminal 1 is wirelessly connected with a plurality of wireless networks 2. FIG. 1 illustrates that the communication terminal 1 is connected to two wireless networks 2a and 2b by way of example, but the number of wireless networks 2 connected to the communication terminal 1 is not particularly limited. When the wireless networks 2a and 2b do not need to be particularly discriminated from each other, they are denoted as "wireless networks 2." The wireless networks 2 are directly or indirectly connected to a wired network 3. The server 4 is directly or indirectly connected to the wired network 3.

The communication terminal 1 is cell phone, Smartphone, tablet terminal, personal computer, or the like, for example. The communication terminal 1 is not limited to the examples.

The wireless networks 2 are wireless LAN, Universal Terrestrial Radio Access Network (UTRAN), Evolved Universal Terrestrial Radio Access Network (E-UTRAN), and the like, and wireless networks other than the above examples are possible.

The wired network 3 is Internet, for example, but is not limited to Internet.

The server 4 is a Web server, for example, but is not limited to a Web server.

Figure 2:
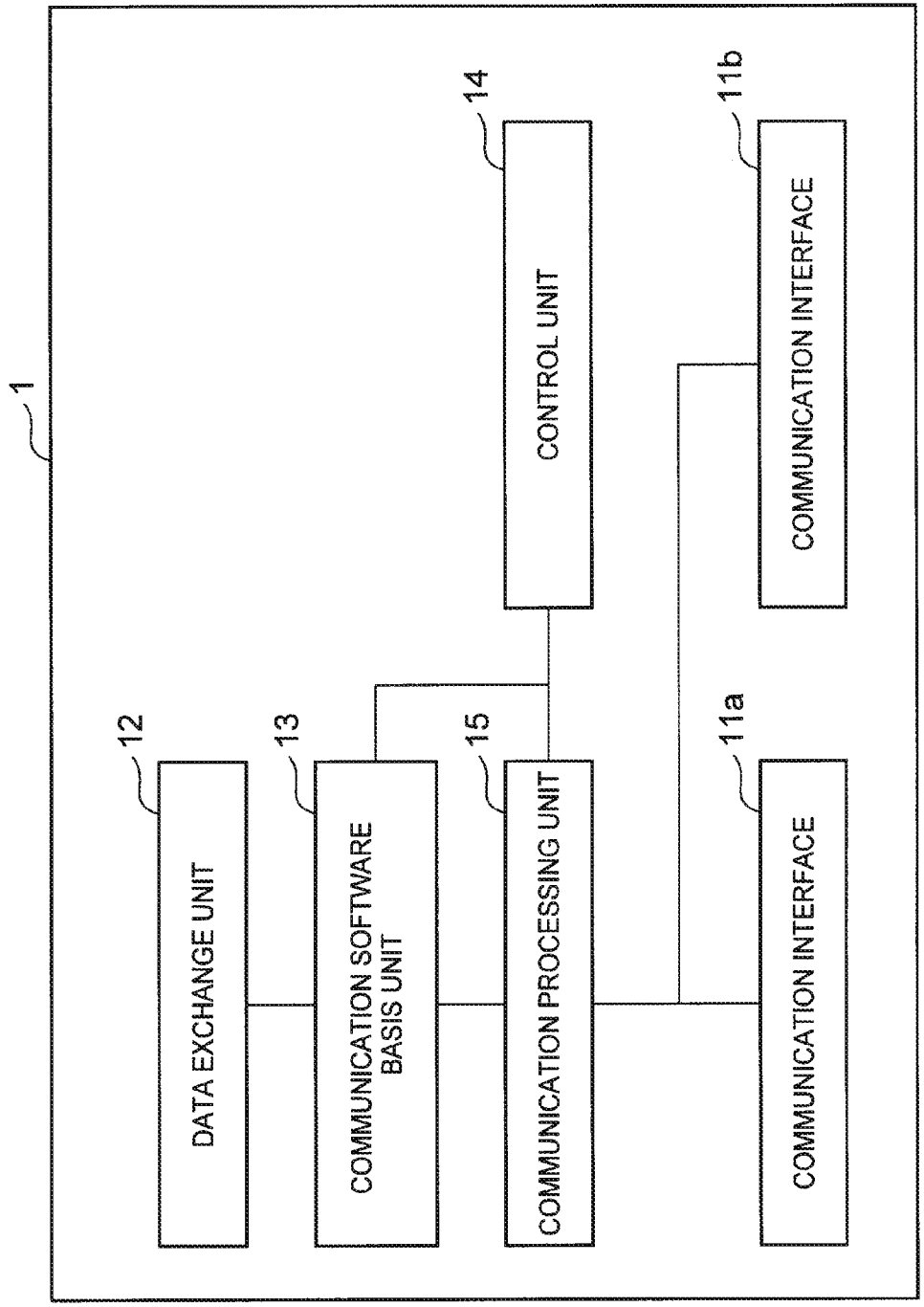
FIG. 2 It depicts a block diagram illustrating an exemplary structure of the communication terminal according to the first exemplary embodiment of the present invention.

FIG. 2 is a block diagram illustrating an exemplary structure of the communication terminal according to the first exemplary embodiment of the present invention. The communication terminal 1 includes a plurality of communication interfaces 11, a data exchange unit 12, a communication software basis unit 13, a communication processing unit 15, and a control unit 14. The communication interfaces 11 are connected to the communication processing unit 15. The communication software basis unit 13 is connected to the data exchange unit 12, the communication processing unit 15, and the control unit 14. The control unit 14 is connected to the communication processing unit 15. The control unit 14 and the communication processing unit 15 may not be directly connected with each other. For example, the control unit 14 and the communication processing unit 15 may be connected with each other via the communication software basis unit 13. The present exemplary embodiment will be described assuming that the control unit 14 and the communication processing unit 15 are directly connected with each other.

The communication interfaces 11 make communication with the outside via the wireless networks 2. One communication interface 11 corresponds to at least one wireless network 2. The communication interface 11 outputs packets input from the communication processing unit 15 to the wireless network 2. The communication interface 11 sends packets input from the wireless network 2 to the communication processing unit 15. The present exemplary embodiment will be described assuming that the communication terminal 1 includes two communication interfaces 11a and 11b, the communication interface 11a corresponds to the wireless network 2a and the communication interface 11b corresponds to the wireless network 2b. When the communication interfaces 11a and 11b do not need to be particularly discriminated, they are denoted as "communication interfaces 11." The communication terminal 1 may include three or more communication interfaces 11.

The communication interfaces 11 are wireless LAN module or wireless modem module, for example, but are not limited to the example.

The data exchange unit 12 designates a communication protocol and a destination for the communication software basis unit 13 thereby to exchange data with the communication software basis unit 13. The communication software basis unit 13 generates a packet based on the data and the communication terminal 1 exchanges the packet with the server 4 thereby to exchange the data with the server 4. Further, the data exchange unit 12 instructs the communication software basis unit 13 to perform a connection processing for exchanging the packet with the server 4 depending on a type of the communication protocol.

The data exchange unit 12 is realized by the CPU in a computer operating according to a program such as Web browser. For example, the communication terminal includes a program storage device (not illustrated) for storing the program therein, and the CPU reads the program from the program storage device, and may operate as the data exchange unit 12 according to the program. The program for causing the CPU to function as the data exchange unit 12 is not limited to Web browser, and may be other program.

The communication software basis unit 13 generates a packet based on the data input from the data exchange unit 12. When a packet received from the server 4 is input into the communication software basis unit 13, the communication software basis unit 13 extracts the data from the packet and sends the extracted data to the data exchange unit 12.

Herein, the data sent from the data exchange unit 12 to the communication software basis unit 13 is data directed for receiving a service from the destination device (the server 4 in the present exemplary embodiment) (or data directed for receiving a service provided by the server 4). Data for receiving a service from a destination device may be denoted as actual data. The communication software basis unit 13 then generates a packet including actual data. Therefore, a packet generated by the communication software basis unit 13 is different from a route search frame (route determination dedicated packet) described in Patent Literature 1. The communication terminal 1 according to the present invention specifies a wireless network 2 through which packets can pass (more specifically, a communication interface 11 corresponding to a wireless network 2 through which packets can pass) by use of a packet including actual data for receiving a service from a destination device.

When input with data (actual data) from the data exchange unit 12, the communication software basis unit 13 determines the transmission source address according to a communication transfer rule previously set in the communication software basis unit 13. The communication software basis unit 13 then generates a packet including, in the header, the transmission source address and the transmission destination address designated by the data exchange unit 12 based on the data input from the data exchange unit 12. The communication software basis unit 13 sends the generated packet to the communication processing unit 15 according to the communication transfer rule. The present exemplary embodiment assumes that the default setting of the communication transfer rule defines that the communication software basis unit 13 sends generated packets to the communication processing unit 15.

When instructed to perform the connection processing in order to exchange the packet with the server 4 by the data exchange unit 12, the communication software basis unit 13 transmits the packet including the transmission source address and the transmission destination address in the header to the server 4 via the communication processing unit 15. The packet transmission realizes a procedure for connecting to the server 4.

The communication software basis unit 13 is realized by the CPU in the computer operating according to a Transmission Control Protocol (TCP)/Internet Protocol (IP) stack mounted on the kernel in the operating system. For example, the CPU reads the program (the TCP/IP stack in the above example) from the program storage device (not illustrated), and may operate as the communication software basis unit 13 according to the program. The communication transfer rule set in the communication software basis unit 13 is an IP routing setting, for example. TCP is employed as a protocol required for the connection processing for a destination by way of example, but protocols other than TCP may be employed.

The control unit 14 confirms availability of the wireless networks 2 by use of the packet generated by the communication software basis unit 13 or a packet transmitted from the server 4 as a response for the packet. The control unit 14 then controls the packet generated by the communication software basis unit 13 to pass. The control unit 14 sets a communication processing rule for the communication processing unit 15. The communication processing rule defines the processing contents for packets meeting the condition.

The control unit 14 determines a communication processing for packets. "To determine a communication processing" specifically means to determine a functional block in the communication terminal 1 to which a packet is to be sent, a filed in the packet header to be rewritten, and values of the packet header.

When determining a communication processing for the packet generated by the communication software basis unit 13 and transmitted to the server 4, the control unit 14 performs the following series of processing. The control unit 14 acquires the address of a communication interface 11 with reference to the communication software basis unit 13. The control unit 14 determines that a packet (denoted as P) input from the communication software basis unit 13 into the communication processing unit 15 is input into the control unit 14, and then determines that the packet P is a transmission packet (packet to be transmitted to the outside by the communication terminal 1). The control unit 14 then determines a communication interface 11 to be used for transmitting the packet. The present example will be described assuming that the communication interface 11a is determined as a destination to which the packet is to be sent from the communication processing unit 15. Further, the control unit 14 stores a packet (denoted as P') as a copied packet P, and stores information on a time (denoted as T) in which a current time is added with a predetermined time t. The time T is a timeout determination reference time. The control unit 14 then instructs the communication processing unit 15 to perform the communication processing on the packet P. The control unit 14 determines to use the communication interface 11a, and thus instructs the communication processing unit 15 to rewrite the transmission source address in the header of the packet P to the address of the communication interface 11a and to send the packet P to the communication interface 11a.

The control unit 14 may determine a communication interface 11 to which a packet is to be sent from the communication processing unit 15 according to a predetermined rule, for example.

The control unit 14 may individually instruct the communication processing unit 15 to perform the communication processing. Alternatively, the control unit 14 may set a communication processing rule for the communication processing unit 15 thereby to instruct the same to perform the communication processing.

When receiving the packet P, the server 4 transmits a packet (denoted as Q) corresponding to the packet P to the communication terminal 1. The packet Q may be a packet corresponding to the stored packet P'.

When the packet Q is input from the communication processing unit 15 into the control unit 14 until the time T, the control unit 14 individually sets a communication processing rule for packets having the same header as the packet P' (or packets having the same header as the non-rewritten packet P) and a communication processing rule for packets having the same header as the packet Q in the communication processing unit 15. "Packets having the same header as packet P'" will be denoted as "packets having the same header as packet P" in the following.

The control unit 14 sets a communication processing rule of rewriting the transmission source address in the header to the address of the communication interface 11a and sending the packet to the communication interface 11a as a communication processing for packets having the same header as the packet P in the communication processing unit 15.

The control unit 14 sets a communication processing rule of rewriting the transmission destination address in the header to the address of the communication processing unit 15 and sending the packet to the communication software basis unit 13 as a communication processing for packets having the same header as the packet Q in the communication processing unit 15.

When the communication processing rule for packets having the same header as the packet P and the communication processing rule for packets having the same header as the packet Q set in the communication processing unit 15, the control unit 14 may discard the stored packet P'.

Further, the control unit 14 may individually instruct the communication processing unit 15 to perform the communication processing. In this case, each time a packet having the same header as the packet Q is input into the control unit 14, the control unit 14 may individually instruct the communication processing unit 15 to perform the communication processing having the same contents as the contents indicated in the communication processing rule.

The control unit 14 may determine whether an input packet is the packet Q corresponding to the packet P' as follows. That is, when the condition is met in which an input packet is received by the communication interface 11a transmitting the packet P and part of the header of the packet matches with part of the header of the stored packet P', the control unit 14 determines that the input packet is the packet Q corresponding to the packet P'. When the condition is not met, the control unit 14 determines that the input packet does not correspond to the packet P'.

When the packet Q is received by the communication interface 11a, the control unit 14 may change the rule for determining a communication interface 11 to which a packet is to be sent from the communication processing unit 15. For example, when the packet P is transmitted from the communication interface 11 determined as a destination to which the packet is to be sent from the communication processing unit 15 and the packet Q corresponding to the packet P is received by the communication interface 11, the control unit 14 may increase the propriety of selecting the communication interface 11 in the rule. The present exemplary embodiment will be described assuming that the rule is changed in this way. The control unit 14 may update the rule with other reference. For example, the control unit 14 may change the rule based on the past history after transmission of the packet P until reception of the packet Q within the time t or the past history of times after transmission of the packet P until reception of the packet Q. As an example of the rule change, for example, when the history indicates that a time after transmission of the packet P until reception of the packet Q is gradually longer, the priority of selecting a communication interface 11 may be decreased.

When the packet Q corresponding to the packet P is not input into the control unit 14 until the time T, the control unit 14 determines that the wireless network 2a corresponding to the communication interface 11a determined as a destination to which the packet is to be sent from the communication processing unit 15 is not available. The control unit 14 then instructs the communication processing unit 15 to rewrite the transmission source address in the header of the stored packet P' to the address of the other communication interface 11b and to send the packet P' to the communication interface 11b. At this time, the control unit 14 updates the stored time T.

When it is determined that both the wireless networks 2a and 2b are not available, the control unit 14 may discard the stored packet P'. Alternatively, the control unit 14 may confirm the availability of the wireless network 2a again.

The control unit 14 is an OPENFLOW controller which is an example of SDN (Software Defined Networking), for example, but is not limited to the example. The control unit 14 is realized by the CPU in the computer operating according to the program, for example. For example, the CPU reads the program from the program storage device (not illustrated), and may operate as the control unit 14 according to the program.

The communication processing unit 15 performs the processing on an input packet based on zero or more communication processing rules set in the control unit 14 and the communication processing execution instructions from the control unit 14. For example, the communication processing unit 15 rewrites the header of a packet or transfers a packet to other functional block in the communication terminal 1. For the packet input from the communication software basis unit 13, the communication processing unit 15 rewrites the transmission source address in the header to the address of the communication interface 11a and sends the packet P to the communication interface 11a under control of the control unit 14. For the packet Q received by the communication interface 11, the communication processing unit 15 rewrites the transmission destination address in the header to the address of the communication processing unit 15 and sends the packet to the communication software basis unit 13, for example, under control of the control unit 14. The communication processing unit 15 transfers, to the control unit 14, a packet which does not match with any communication processing rule set in the communication processing unit 15 or a packet which matches with a communication processing rule defining packet transfer to the control unit 14.

The communication processing unit 15 is an OPEN-FLOW switch, for example. When the communication processing unit 15 is an OPENFLOW switch, the address of the communication processing unit 15 is attached to a local port of the OPENFLOW switch or attached to a virtual Ethernet (registered trademark) device connected to the OPENFLOW switch and the communication software basis unit 13. The communication processing unit 15 is not limited to OPEN-FLOW switch. Further, the communication processing unit 15 may be realized by the CPU in the computer operating according to the program, for example. For example, the CPU reads the program from the program storage device (not illustrated), and may operate as the communication processing unit 15 according to the program.

A processing progress of the first exemplary embodiment will be described below.

Figure 3:
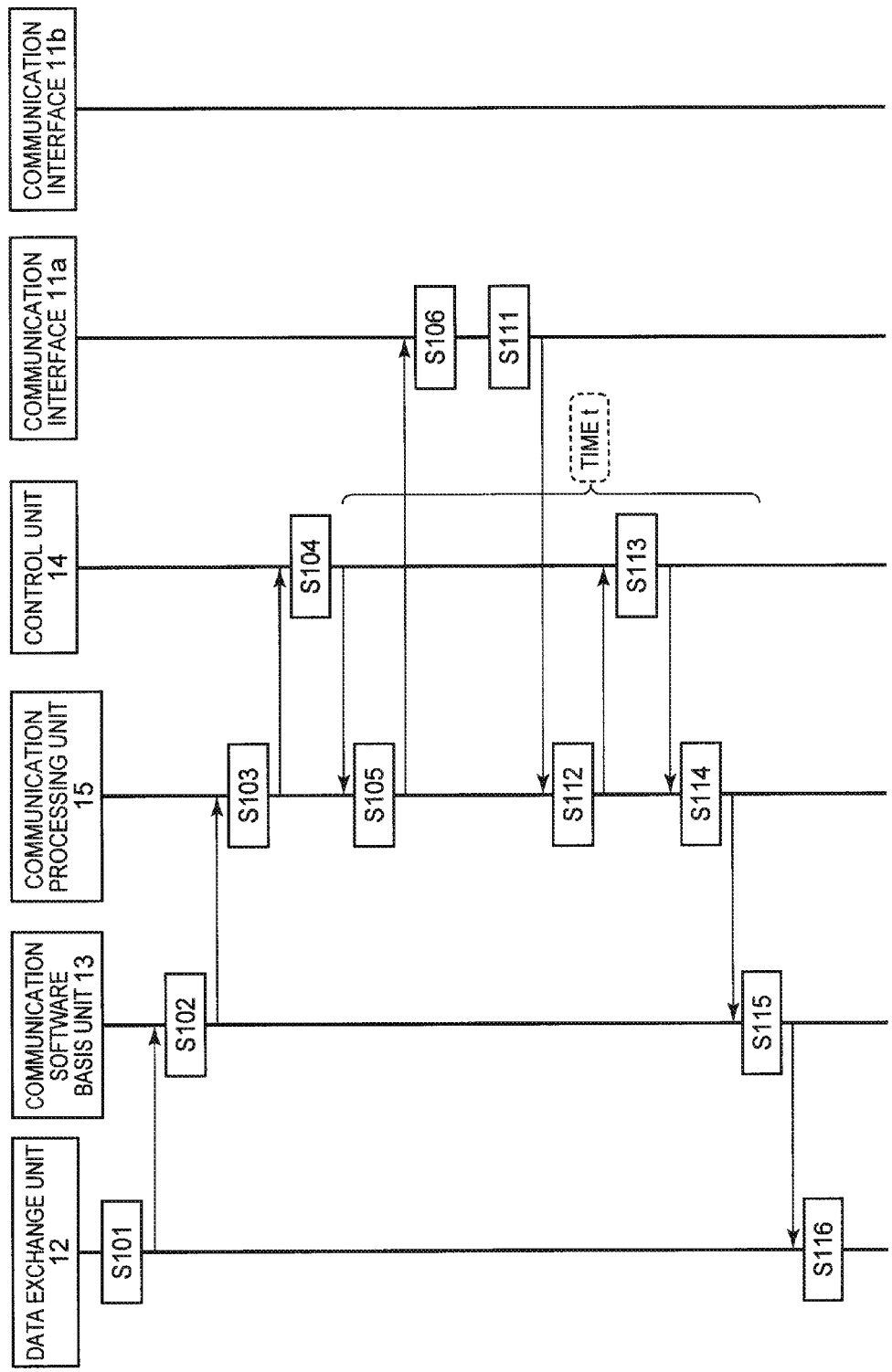

FIG. 3 is a flowchart illustrating an exemplary processing progress when packets can pass through the wireless network 2a (see FIG. 1).

The data exchange unit 12 sends data (actual data for receiving a service from the destination server 4) to be sent to the server 4 to the communication software basis unit 13 (step S101). At this time, the data exchange unit 12 designates the address of the server 4 as the transmission destination address.

The communication software basis unit 13 searches a communication transfer rule. The communication software basis unit 13 then determines the address of the communication processing unit 15 as the transmission source address of the packet according to the communication transfer rule. The communication software basis unit 13 generates a packet P including the transmission source address and the transmission destination address designated by the data exchange unit 12 (the address of the server 4) in the header based on the data input from the data exchange unit 12. The communication software basis unit 13 sends the packet P to the communication processing unit 15 (step S102).

The communication processing unit 15 collates the packet P input from the communication software basis unit 13 with the communication processing rules, and when a communication processing rule matching with the packet P is not present or when the packet P matches with a communication processing rule defining packet transfer to the control unit 14, sends the packet P to the control unit 14 (step S103). The present example will be described assuming that a communication processing rule matching with the packet P is not present.

Figure 4:
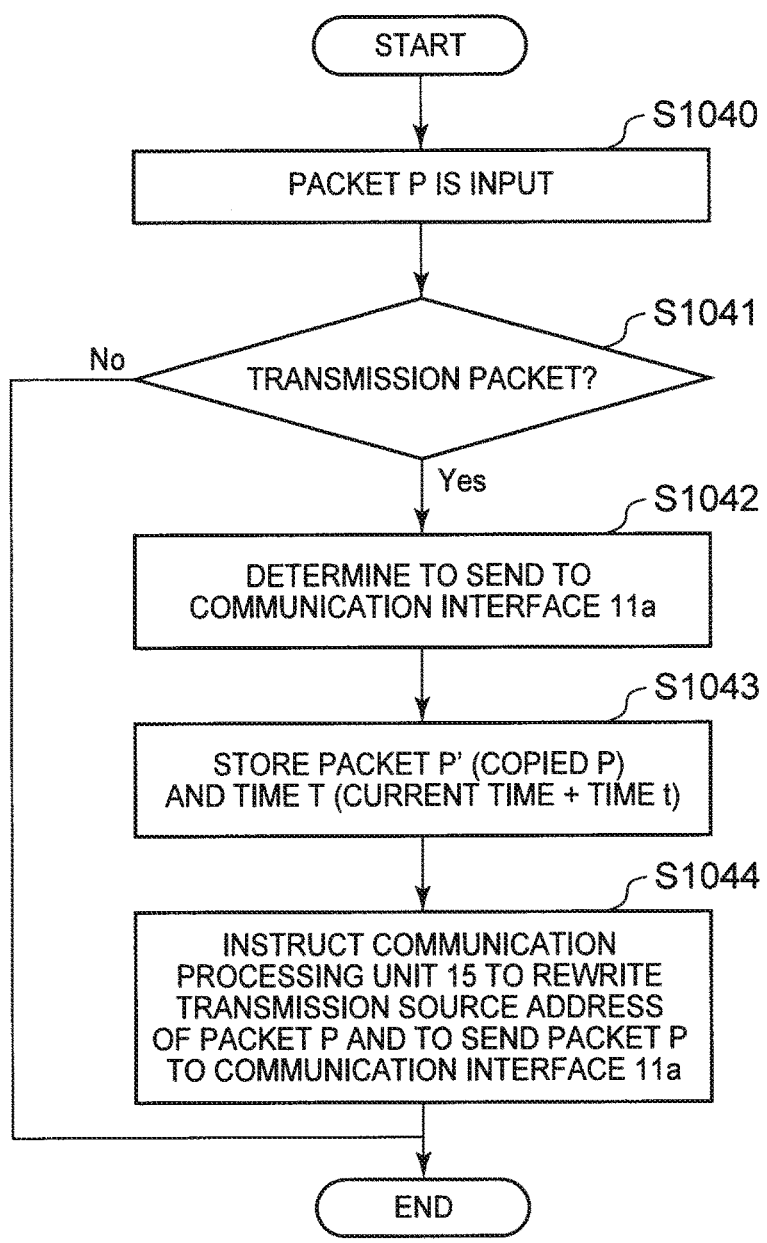
FIG. 4 It depicts a flowchart illustrating an exemplary processing progress of step S104.

When the packet P is a transmission packet, the control unit 14 instructs the communication processing unit 15 to perform the communication processing on the packet P (step S104). FIG. 4 is a flowchart illustrating an exemplary processing progress of step S104.

The control unit 14 is input with the packet P from the communication processing unit 15 (step S1040). The control unit 14 determines whether the packet P is input from the communication software basis unit 13 into the communication processing unit 15, and determines whether the packet P is a transmission packet (packet to be transmitted to the outside by the communication terminal 1) (step S1041).

The control unit 14 may determine whether the packet P is input from the communication software basis unit 13 into the communication processing unit 15 based on a combination of the transmission source address and the transmission destination address in the header. Further, when the communication processing unit 15 sends a packet to the control unit 14, the control unit 14 may be notified of a functional block from which the packet is notified to the communication processing unit 15, and the control unit 14 may determine whether the packet P is input from the communication software basis unit 13 into the communication processing unit 15 based on the notification. Further, when the control unit 14 is an OPENFLOW controller and the communication processing unit 15 is an OPENFLOW switch, the control unit 14 may determine whether the packet P is input from the communication software basis unit 13 into the communication processing unit 15 based on the information on a switch port of the communication processing unit 15 into which the packet is input.

When the packet P is not a transmission packet (No in step S1041), the processing is terminated.

When the packet P is a transmission packet (Yes in step S1041), the control unit 14 determines to which communication interface to send the packet P according to the previously-defined predetermined rule (step S1042). The present example will be described assuming that the packet P is determined to be sent to the communication interface 11a.

The control unit 14 stores a packet P' as a copied packet P, and stores the information on the time T in which a current time is added with the predetermined time t (step S1043).

The control unit 14 then instructs the communication processing unit 15 to rewrite the transmission source address in the header of the packet P to the address of the communication interface 11a and to send the packet P to the communication interface 11a (step S1044).

The communication processing unit 15 rewrites the transmission source address in the header of the packet P to the address of the communication interface 11a and sends the packet P to the communication interface 11a in response to the instruction from the control unit 14 (step S105).

The communication interface 11a outputs the packet P input from the communication processing unit 15 to the wireless network 2a (step S106).

The wireless network 2a is available to packets, and the packet P is transmitted to the server 4. The server 4 then transmits a packet Q corresponding to the packet P to the transmission source of the packet P. Consequently, the packet Q is transmitted to the communication terminal 1 via the wireless network 2a and is received by the communication interface 11a.

The communication interface 11a sends the packet Q received from the wireless network 2a to the communication processing unit 15 (step S111).

The communication processing unit 15 collates the packet Q input from the communication interface 11a with the communication processing rules, and when a communication processing rule matching with the packet Q is not present or when the packet Q matches with a communication processing rule defining packet transfer to the control unit 14, sends the packet Q to the control unit 14 (step S112). The operation is the same as step S103. The present example will be described assuming that a communication processing rule matching with the packet Q is not present.

Figure 5:
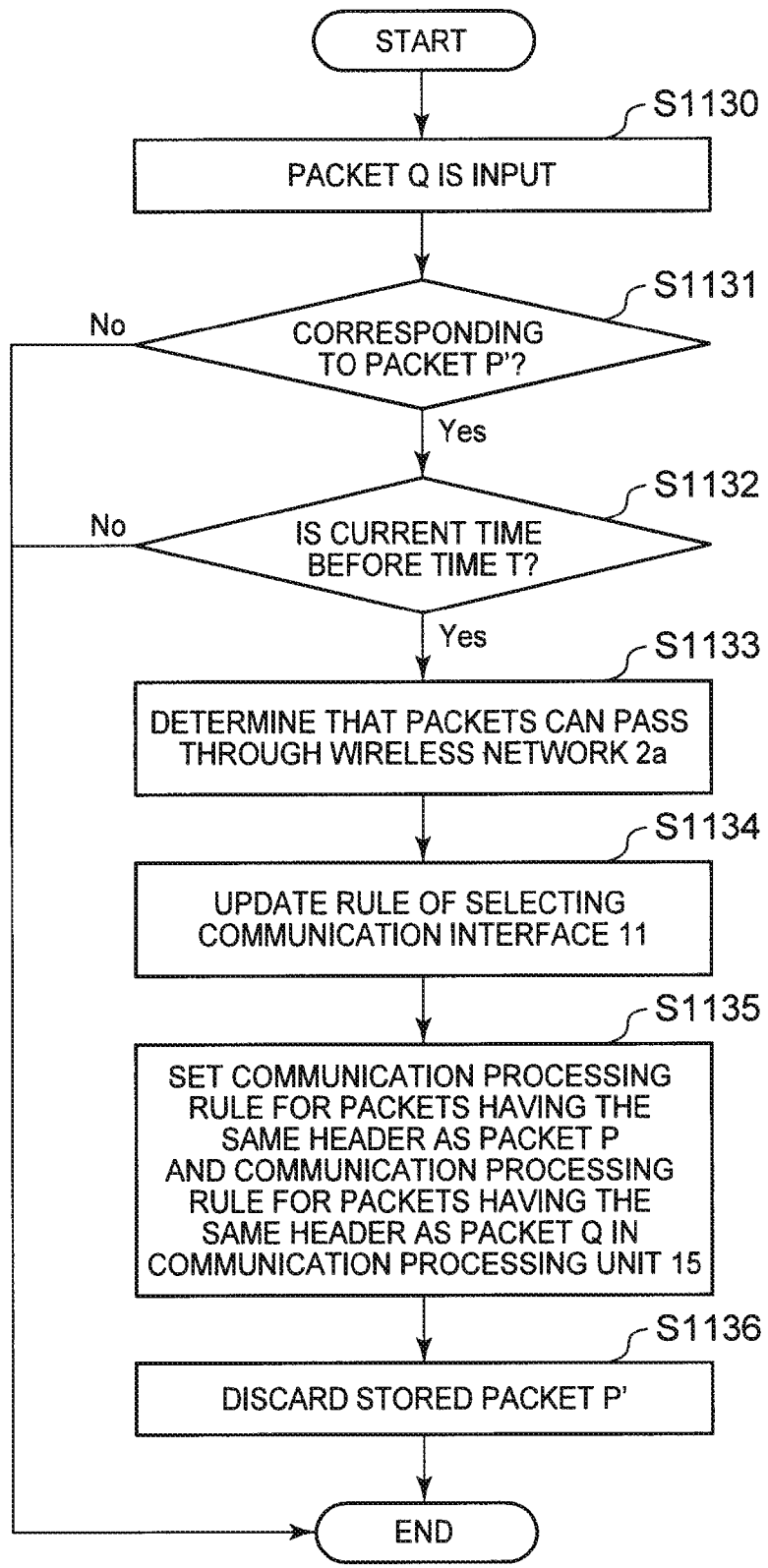
FIG. 5 It depicts a flowchart illustrating an exemplary processing progress of step S113.

The control unit 14 instructs the communication processing unit 15 to perform the processing on the packet Q (step S113). FIG. 5 is a flowchart illustrating an exemplary processing progress of step S113.

The control unit 14 is input with the packet Q from the communication processing unit 15 (step S1130). The control unit 14 determines whether the packet Q corresponds to the packet P' (step S1131). As described above, when the condition is met in which the input packet is received by the communication interface 11a transmitting the packet P and part of the header of the packet matches with part of the header of the stored packet P', the control unit 14 determines that the input packet is the packet Q corresponding to the packet P'. When the condition is not met, the control unit 14 determines that the input packet does not correspond to the packet P'.

When the input packet does not correspond to the packet P' (No in step S1131), the processing is terminated.

When the input packet is the packet Q corresponding to the packet P' (Yes in step S1131), the control unit 14 determines whether a current time is before the time T (step S1132).

When the current time is after the time T (No in step S1132), the processing is terminated.

When the current time is before the time T (Yes in step S1132), the control unit 14 determines that packets can pass through the wireless network 2a corresponding to the communication interface 11a (step S1133).

The control unit 14 then updates the rule for determining a communication interface 11 to which the packet is to be sent from the communication processing unit 15 (step S1134). For example, the control unit 14 increases the priority of selecting the communication interface 11a corresponding to the wireless network 2a determined as available to packets in step S1133. As described above, the control unit 14 may change the rule with other reference.

The control unit 14 then sets a communication processing rule for packets having the same header as the packet P (non-rewritten packet P) and a communication processing rule for packets having the same header as the packet Q in the communication processing unit 15 (step S1135).

The control unit 14 sets a communication processing rule of rewriting the transmission source address in the header to the address of the communication interface 11a for a packet having the same header as the packet P and transmitting the packet to the communication interface 11a in the communication processing unit 15.

The control unit 14 sets a communication processing rule of rewriting the transmission destination address in the header to the address of the communication processing unit 15 for a packet having the same header as the packet Q and sending the packet to the communication software basis unit 13 in the communication processing unit 15.

The control unit 14 then discards the packet P' stored in step S1043 (step S1136).

The communication processing unit 15 then performs the processing of rewriting the transmission destination address in the header of the packet Q to the address of the communication processing unit 15 and sending the packet Q to the communication software basis unit 13 according to the communication processing rule set in step S1135 (step S114).

The communication software basis unit 13 extracts data from the packet input from the communication processing unit 15, and sends the data to the data exchange unit 12 (step S115). Consequently, the data exchange unit 12 acquires the data transmitted from the server 4 (step S116).

Thereafter, when the communication software basis unit 13 generates a packet having the same header as the packet P based on the data input from the data exchange unit 12, the packet is processed in the same manner as the packet P based on the communication processing rule set in step S1135, and is transmitted to the server 4 via the wireless network 2a through which the packet can pass. Also when the server 4 transmits a packet having the same header as the packet Q according to the packet, the packet is processed in the same manner as the packet Q based on the communication processing rule set in step S1135, and is sent to the data exchange unit 12.

Figure 6:
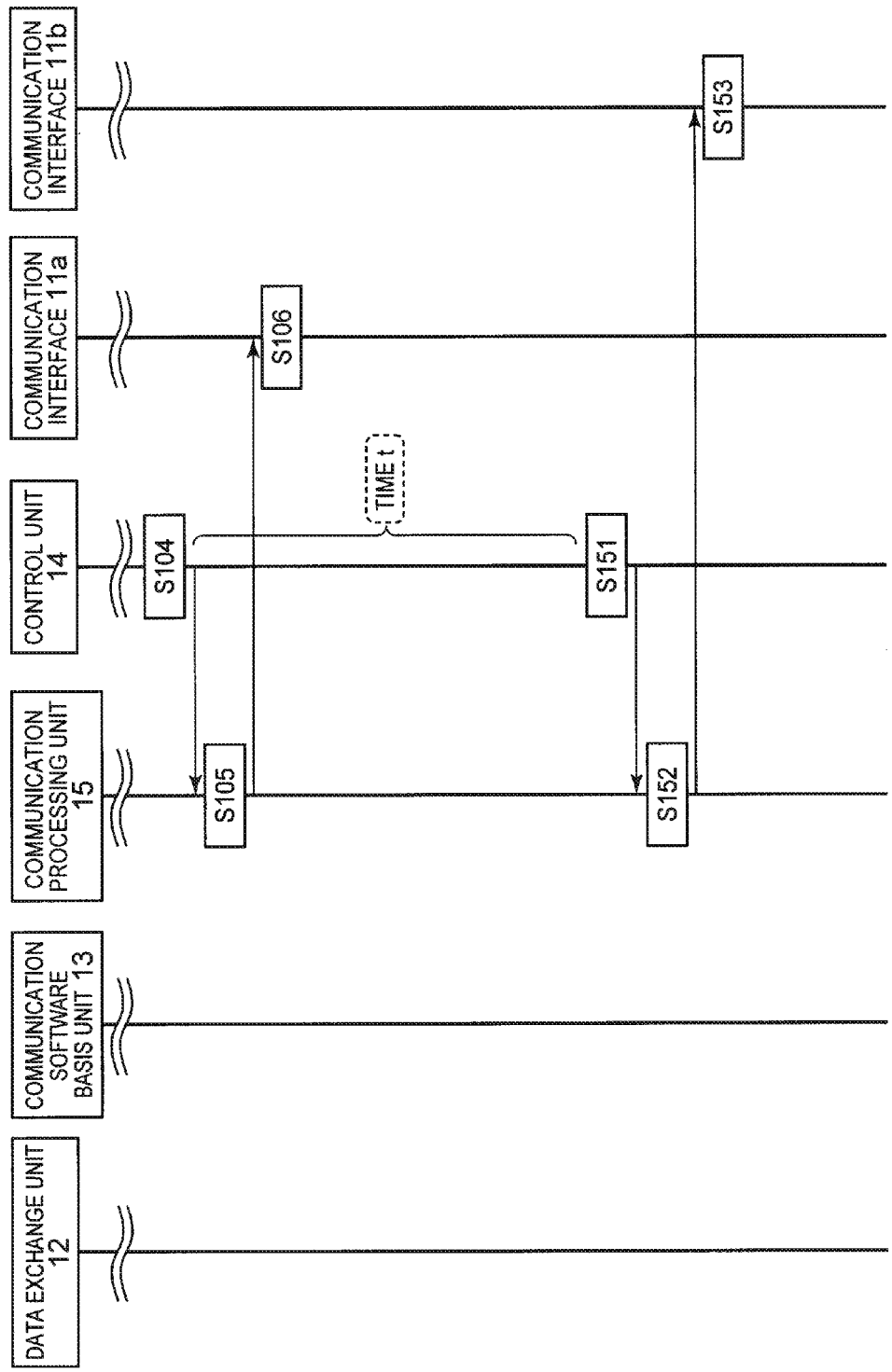
FIG. 6 It depicts a flowchart illustrating an exemplary processing progress when packets cannot pass through the wireless network 2a and packets can pass through a wireless network 2b.

FIG. 6 is a flowchart illustrating an exemplary processing progress when packets cannot pass through the wireless network 2a (see FIG. 1) and packets can pass through the wireless network 2b (see FIG. 1). Steps S101 to S106 are the same as steps S101 to S106 illustrated in FIG. 3, and thus the description thereof will be omitted. Steps S101 to S103 are not illustrated in FIG. 6.

When the communication interface 11a outputs the packet P to the wireless network 2a in step S106, the wireless network 2a is not available, and thus the packet P does not reach the server 4. Therefore, the server 4 does not transmit the packet Q.

Figure 7:
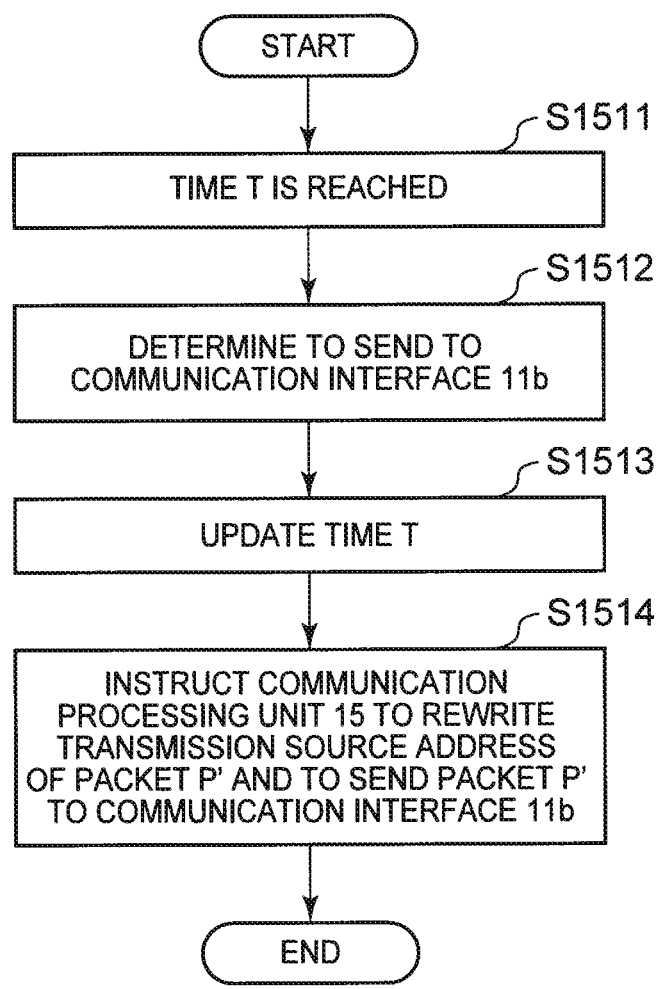
FIG. 7 It depicts a flowchart illustrating an exemplary processing progress of step S151.

When the packet is not input after the time T after step S104, the control unit 14 instructs the communication processing unit 15 to transmit the packet P' via other communication interface (step S151). FIG. 7 is a flowchart illustrating an exemplary processing progress of step S151.

The control unit 14 determines that the time T is reached before the packet Q corresponding to the packet P' is input (step S1511).

Subsequently, the control unit 14 determines to send the packet P' to the different communication interface 11b from the communication interface 11a determined in step S104 (more specifically, in step S1042 illustrated in FIG. 4) (step S1512).

The control unit 14 then updates the time T defined in step S1043 (see FIG. 4) (step S1513). Specifically, the control unit 14 adds the predetermined time t to the time T thereby to update the time T, and stores the information on the updated time T.

The control unit 14 then instructs the communication processing unit 15 to rewrite the transmission source address in the header of the packet P' to the address of the communication interface 11b and to send the packet P' to the communication interface 11b (step S1514).

The communication processing unit 15 rewrites the transmission source address in the header of the packet P' to the address of the communication interface 11b and sends the packet P' to the communication interface 11b in response to the instruction from the control unit 14 (step S152).

The communication interface 11b outputs the packet P' to the wireless network 2b (step S106).

The wireless network 2b is available to packets, and the packet P' is transmitted to the server 4. The server 4 then transmits the packet Q corresponding to the packet P' to the transmission source of the packet P. Consequently, the packet Q is transmitted to the communication terminal 1 via the wireless network 2b and is received by the communication interface 11b. The subsequent operations are the same as steps S111 to S116 (see FIG. 3), and thus the description thereof will be omitted.

According to the present exemplary embodiment, a wireless network 2 through which packets can pass can be determined by use of the first packet among the packets for exchanging actual data between the data exchange unit 12 and the server 4 and a response packet therefor. Therefore, a wireless network 2 through which packets can pass can be determined without the use of a route determination dedicated packet. Consequently, it is possible to prevent communication efficiency or power efficiency from being deteriorated.

According to the present exemplary embodiment, the communication software basis unit 13 generates a packet P including actual data with the address of the communication processing unit 15 as the transmission source address, and the communication processing unit 15 rewrites the transmission source address to the address of a communication interface 11 according to a communication processing rule. Since the wireless network 2 corresponding to the communication interface 11 is not available, when transmitting the packet P' (copied packet P), the communication processing unit 15 rewrites the transmission source address to the address of the other communication interface 11 according to the communication processing rule. Therefore, also when the communication interface is to be switched since the wireless network 2 is not available, the communication procedure in the communication software basis unit 13 and the server 4 are not influenced.

Second Exemplary Embodiment

Figure 8:
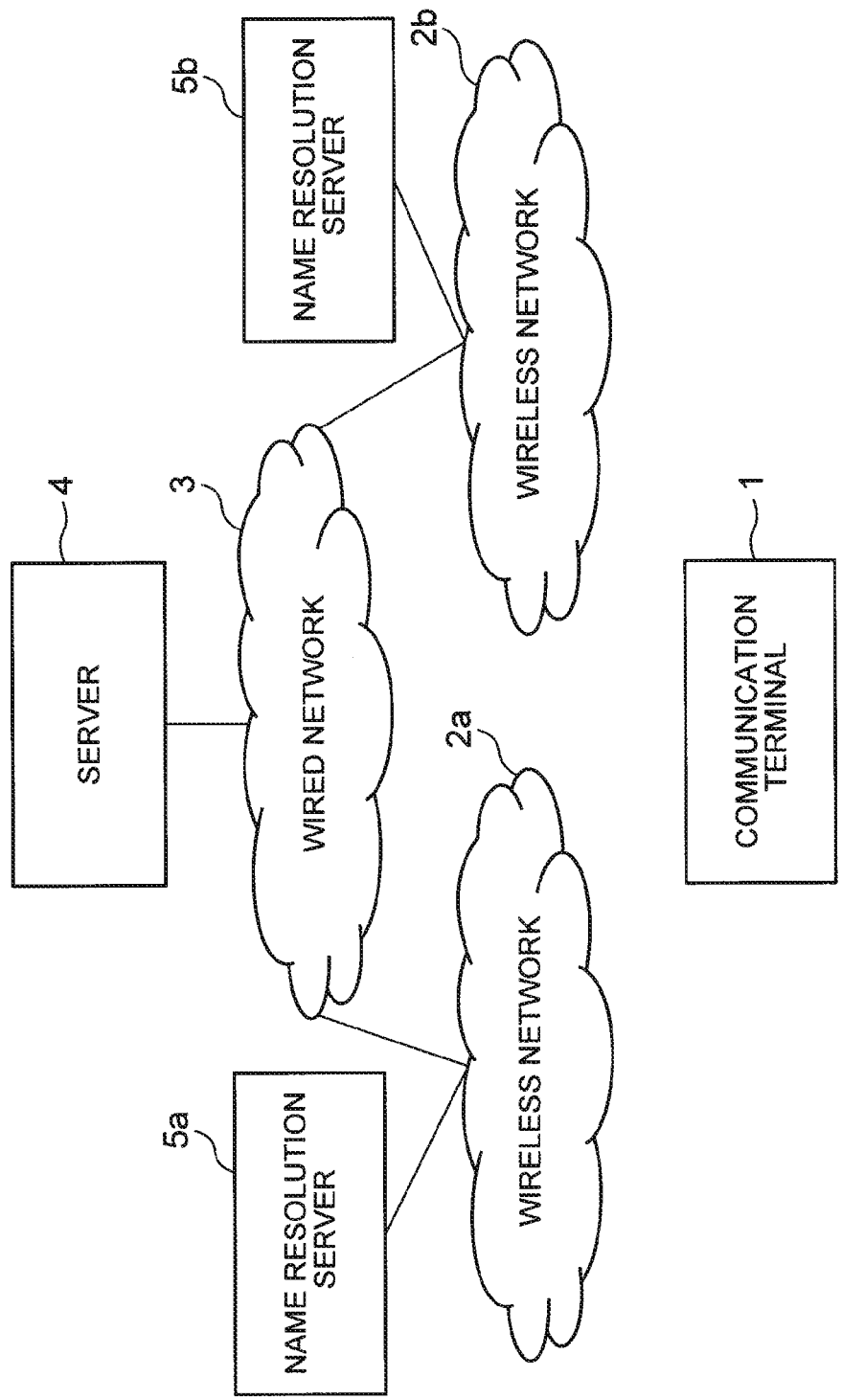
FIG. 8 It depicts a schematic diagram illustrating a communication system including a communication terminal according to a second exemplary embodiment of the present invention.

FIG. 8 is a schematic diagram illustrating a communication system including a communication terminal according to a second exemplary embodiment of the present invention. The server 4, the wireless networks 2a, 2b, and the wired network 3 illustrated in FIG. 8 are the same as the server 4, the wireless networks 2a, 2b, and the wired network 3 according to the first exemplary embodiment, respectively. The communication system illustrated in FIG. 8 is such that the communication system illustrated in FIG. 1 is added with a name resolution server 5. FIG. 8 illustrates that the communication system includes two name resolution servers 5a and 5b, but the number of name resolution servers 5 is not particularly limited. When the name resolution servers 5a and 5b do not need to be particularly discriminated from each other, they are denoted as "name resolution servers 5." The name resolution servers 5 may be connected to the wired network 3, but the present exemplary embodiment will be described assuming that the name resolution servers 5 are connected to the wireless networks 2. FIG. 8 illustrates that the name resolution server 5a is connected to the wireless network 2a and the name resolution server 5b is connected to the wireless network 2b.

When receiving a name resolution request packet from the communication terminal 1, the name resolution server 5 interprets the name resolution request packet, searches the address corresponding to the name of a device included in the name resolution request packet, and transmits a name resolution response packet including the name and the address to the communication terminal 1. The name resolution request packet includes the name of the device as data for receiving a service of "name resolution" provided by the name resolution server 5. Therefore, the name resolution request packet includes actual data.

The name resolution servers 5 are domain name service (DNS) servers, for example. The name resolution servers 5 are not limited to domain name service server.

Figure 9:
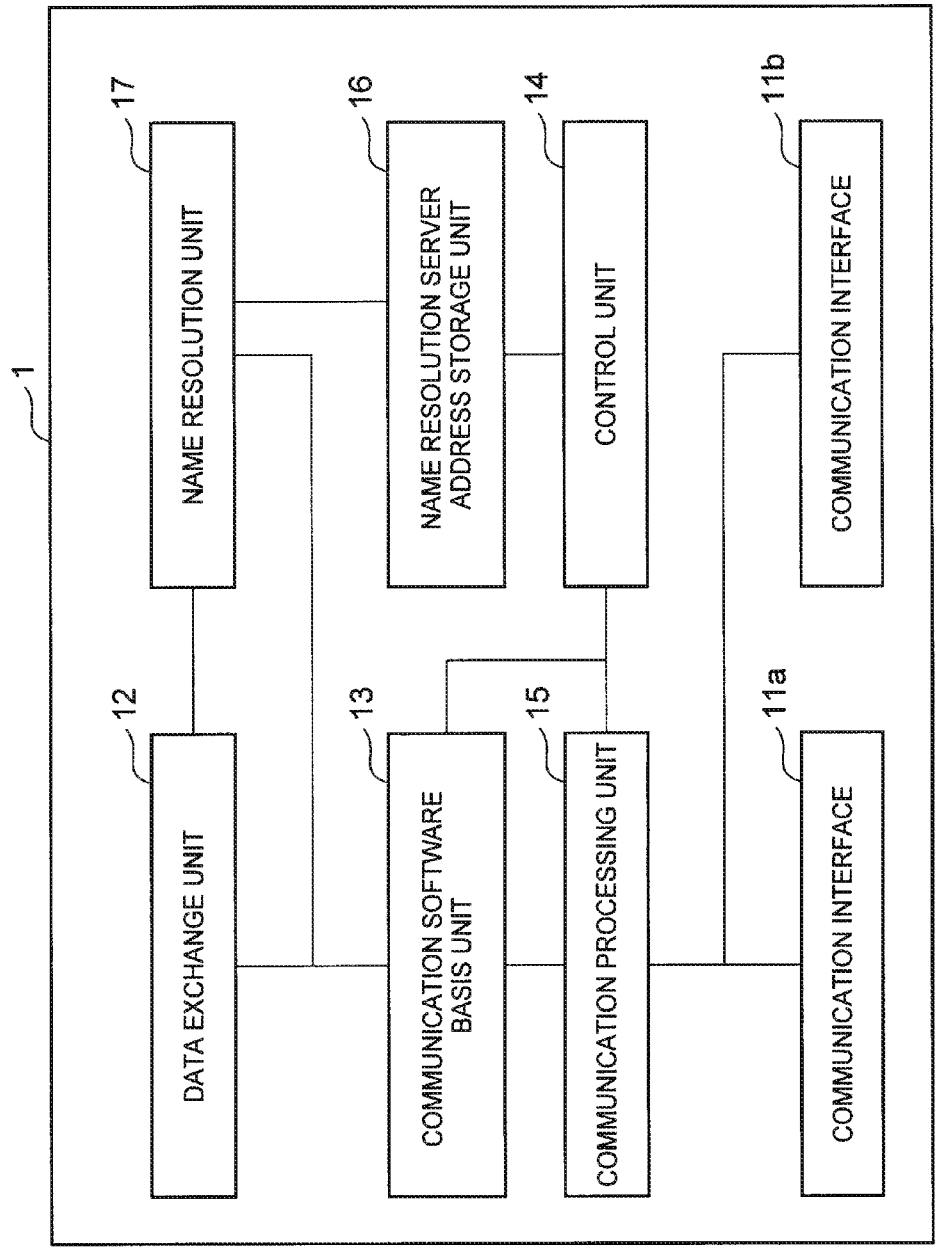
FIG. 9 It depicts a block diagram illustrating an exemplary structure of the communication terminal according to the second exemplary embodiment of the present invention.

FIG. 9 is a block diagram illustrating an exemplary structure of the communication terminal according to the second exemplary embodiment of the present invention. The communication terminal 1 according to the second exemplary embodiment is such that the communication terminal 1 according to the first exemplary embodiment (see FIG. 2) is added with a name resolution server address storage unit 16 and a name resolution unit 17. The name resolution server address storage unit 16 is connected to the control unit 14 and the name resolution unit 17. The name resolution unit 17 is connected to the data exchange unit 12 and the communication software basis unit 13 in addition to the name resolution server address storage unit 16.

The name resolution server address storage unit 16 is a storage device for storing a correspondence between the communication interfaces 11 and the addresses of the name resolution servers 5. For example, the name resolution server 5a is connected to the wireless network 2a corresponding to the communication interface 11a. Therefore, the name resolution server address storage unit 16 associates the communication interface 11a with the address of the name resolution server 5a for storage. Similarly, the name resolution server address storage unit 16 associates the communication interface 11b with the address of the name resolution server 5b for storage. The name resolution server address storage unit 16 may store a correspondence between the communication interfaces 11 and the addresses of the name resolution servers 5 as a file or database, for example, or may store it in other form.

When input with name resolution request data including the name of the server 4 from the data exchange unit 12, the name resolution unit 17 selects the address of a name resolution server 5 with reference to the name resolution server address storage unit 16. The name resolution unit 17 then designates the address of the selected name resolution server 5, and sends the name resolution request data to the communication software basis unit 13. The name resolution request data including the name of the server 4 is data (actual data) for receiving the name resolution service provided by the name resolution server 5. A reference with which the name resolution unit 17 selects the address of a name resolution server 5 from the name resolution server address storage unit 16 is previously defined as a selection priority, for example. The present example will be described assuming that the address of the name resolution server 5a is selected.

When the communication terminal 1 receives the name resolution response packet, and name resolution response data included in the name resolution response packet is input from the communication software basis unit 13 into the name resolution unit 17, the name resolution unit 17 sends the name resolution response data to the data exchange unit 12. The name resolution response data includes the name of a device (the server 4 in the present example) and the address of the device.

The name resolution unit 17 is realized by the CPU in the computer operating according to the program such as DNS resolver. For example, the CPU reads the program from the program storage device, and may operate as the name resolution unit 17 according to the program. The program for causing the CPU to function as the name resolution unit 17 is not limited to DNS resolver, and may be other program.

The communication software basis unit 13 is input with the address of the name resolution server 5 and the name resolution request data from the name resolution unit 17. The communication software basis unit 13 then generates a name resolution request packet (denoted as N) based on the name resolution request data. The communication software basis unit 13 assumes the address of the communication processing unit 15 as the transmission source address of the name resolution request packet N, and assumes the address of the name resolution server 5 designated by the name resolution unit 17 as the transmission destination address of the name resolution request packet N. The communication software basis unit 13 sends the name resolution request packet N to the communication processing unit 15.

Further, when the communication terminal 1 receives the name resolution response packet and the name resolution response packet is input from the communication processing unit 15 into the communication software basis unit 13, the communication software basis unit 13 extracts the name resolution response data from the name resolution response packet. The communication software basis unit 13 then sends the name resolution response data to the name resolution unit 17.

A name resolution response packet transmitted as a response for the name resolution request packet N by the name resolution server 5 will be denoted as M below.

According to the present exemplary embodiment, the control unit 14 confirms availability of the wireless networks 2 by use of the name resolution request packet N and the name resolution response packet M. The control unit 14 then controls the name resolution request packet N to pass.

When input with the name resolution request packet N from the communication processing unit 15, the control unit 14 determines a communication interface 11 used for transmitting the name resolution request packet N (or a communication interface 11 to which the name resolution request packet N is to be sent from the communication processing unit 15). At this time, the control unit 14 may determine a communication interface 11 used for packet transmission according to the predetermined rule similarly as in the first exemplary embodiment. The present example will be described assuming that the communication interface 11a is determined as a destination to which the name resolution request packet N is to be sent from the communication processing unit 15. Further, the control unit 14 stores a packet (denoted as N') as a copied name resolution request packet N, and stores information on the time T in which a current time is added with the predetermined time t. The control unit 14 then instructs the communication processing unit 15 to perform the communication processing on the name resolution request packet N. Specifically, the control unit 14 determines to use the communication interface 11a, and thus instructs the communication processing unit 15 to rewrite the transmission source address in the header of the name resolution request packet N to the address of the communication interface 11a and to send the name resolution request packet N to the communication interface 11a.

The control unit 14 determines a communication interface 11 used for packet transmission, and then searches the address of a name resolution server 5 corresponding to the determined communication interface 11 with reference to the name resolution server address storage unit 16. In the present example, the address of the name resolution server 5a corresponding to the communication interface 11a is searched. When the searched address of the name resolution server 5a is collated with the transmission destination address of the name resolution request packet N and the two addresses do not match with each other, the control unit 14 instructs the communication processing unit 15 to rewrite the transmission destination address of the name resolution request packet N to the address of the name resolution server 5 corresponding to the determined communication interface 11. On the other hand, when the two addresses match with each other, the control unit 14 does not instruct to rewrite the transmission destination address of the name resolution request packet N.

For example, the transmission destination address of the name resolution request packet N is assumed as the address of the name resolution server 5b. It is assumed that the control unit 14 then determines to use the communication interface 11a for transmitting the name resolution request packet N and searches the address of the name resolutions server 5a corresponding to the communication interface 11a. In this case, the control unit 14 instructs the communication processing unit 15 to rewrite the transmission destination address of the name resolution request packet N to the address of the name resolution server 5a.

When receiving the name resolution request packet N, the name resolution server 5 transmits the name resolution response packet M corresponding to the name resolution request packet N to the communication terminal 1.

When the name resolution response packet M is input from the communication processing unit 15 into the control unit 14 until the time T, the control unit 14 determines that the wireless network 2 connected to the communication interface 11 receiving the name resolution response packet M is available. The control unit 14 then sets a communication processing rule for packets having the same header as the name resolution request packet N (non-rewritten name resolution request packet N) and a communication processing rule for packets having the same header as the name resolution response packet M in the communication processing unit 15.

The control unit 14 sets, in the communication processing unit 15, a communication processing rule of rewriting the transmission source address in the header to the address of the communication interface 11a, rewriting the transmission destination address in the header to the address of the name resolution server 5a, and sending the packet to the communication interface 11a as the communication processing rule for packets having the same header as the name resolution request packet N.

Further, the control unit 14 sets a communication processing rule of rewriting the transmission source address in the header to the transmission destination address of the name resolution request packet N', rewriting the transmission destination address in the header to the address of the communication processing unit 15, and sending the packet to the communication software basis unit 13 as the communication processing rule for packets having the same header as the name resolution response packet M.

Further, the name resolution response data stored in the payload of the name resolution response packet M includes the name of a device (the server 4 in the present example) and the address of the device. When input with a packet including the address of the device (the server 4) as the transmission destination address from the communication processing unit 15, the control unit 14 may define to select a communication interface 11 (assuming the communication interface 11a) first receiving the name resolution response packet M as a destination to which the packet is to be sent within a certain period of time. In this case, when the communication software basis unit 13 generates a packet with the address of the server 4 as the transmission destination address based on the data input from the data exchange unit 12 and the packet is input from the communication processing unit 15 into the control unit 14, the control unit 14 selects the communication interface 11a, and instructs the communication processing unit 15 to send the packet to the communication interface 11a. Consequently, the packet is transmitted to the server 4 via the available wireless network 2a.

Further, when the name resolution response packet M is not input into the control unit 14 until the time T, the control unit 14 determines that the wireless network 2a connected to the communication interface 11a to which the name resolution request packet N is to be sent from the communication processing unit 15 is not available. The control unit 14 then instructs the communication processing unit 15 to rewrite the transmission source address of the stored name resolution request packet N' to the address of the other communication interface 11b and to send the name resolution request packet N' to the communication interface 11b.

A processing progress of the second exemplary embodiment will be described below.

Figure 10:
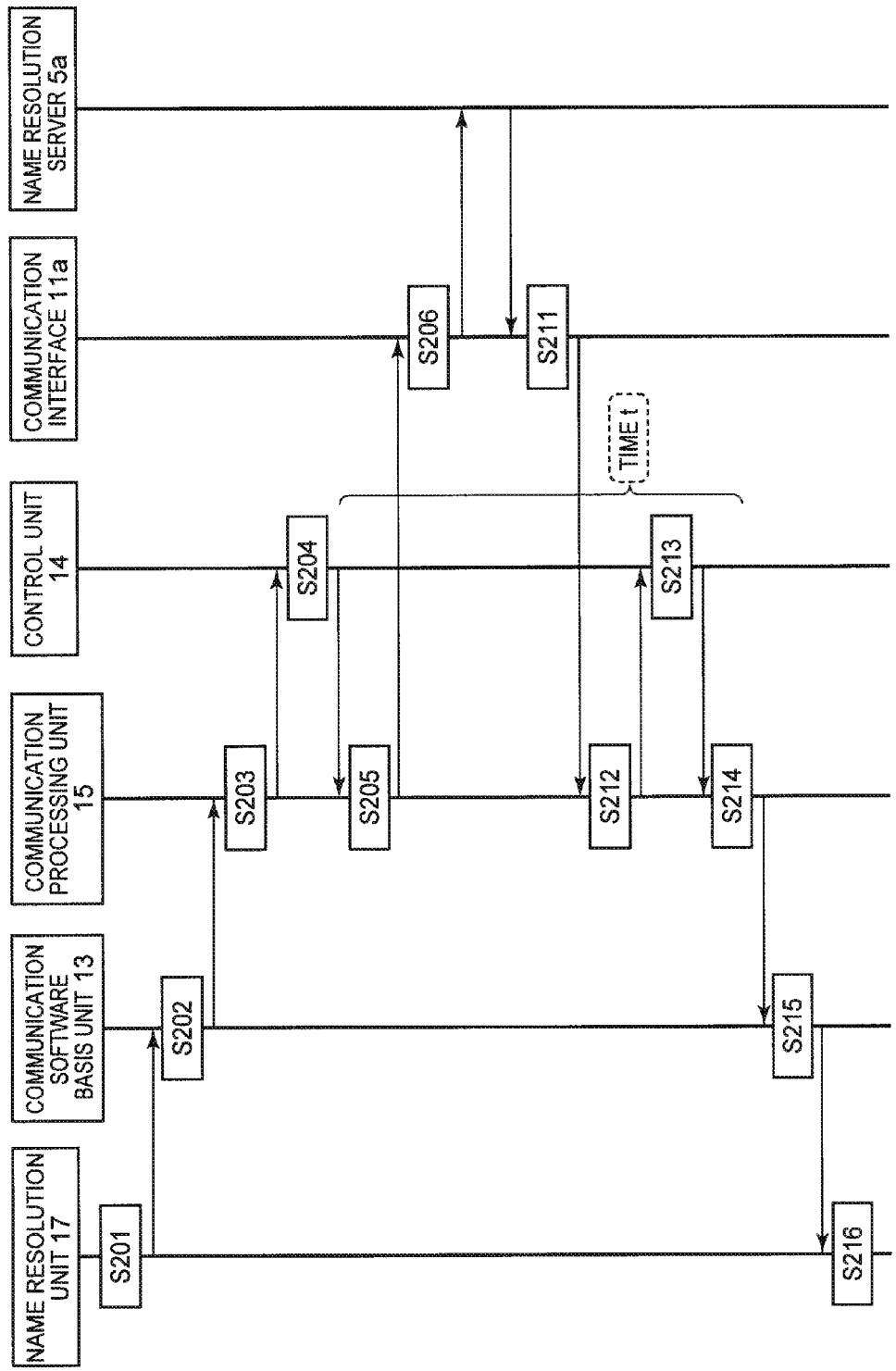

FIG. 10 is a flowchart illustrating an exemplary processing progress when packets can pass through the wireless network 2a (see FIG. 8).

When the data exchange unit 12 (not illustrated in FIG. 10) inputs the name resolution request data including the name of the server 4 into the name resolution unit 17, the name resolution unit 17 selects the address of a name resolution server 5 with reference to the name resolution server address storage unit 16. The present example will be described assuming that the name resolution unit 17 selects the address of the name resolution server 5a according to the predefined priority. The name resolution unit 17 designates the selected address of the name resolution server 5a and sends the name resolution request data to the communication software basis unit 13 (step S201).

The communication software basis unit 13 determines the address of the communication processing unit 15 as the transmission source address of the name resolution request packet according to the communication transfer rule. The operation is the same as in the first exemplary embodiment. The communication software basis unit 13 generates a name resolution request packet N having the header including the transmission source address, and further including the address of the name resolution server 5a designated by the name resolution unit 17 as the transmission destination address based on the name resolution request data. The communication software basis unit 13 sends the name resolution request packet N to the communication processing unit 15 (step S202).

The communication processing unit 15 collates the name resolution request packet N input from the communication software basis unit 13 with the communication processing rules, and when a communication processing rule matching with the name resolution request packet N is not present or when the name resolution request packet N matches with a communication processing rule defining packet transfer to the control unit 14, sends the name resolution request packet N to the control unit 14 (step S203). The present example will be described assuming that a communication processing rule matching with the name resolution request packet N is not present.

Figure 11:
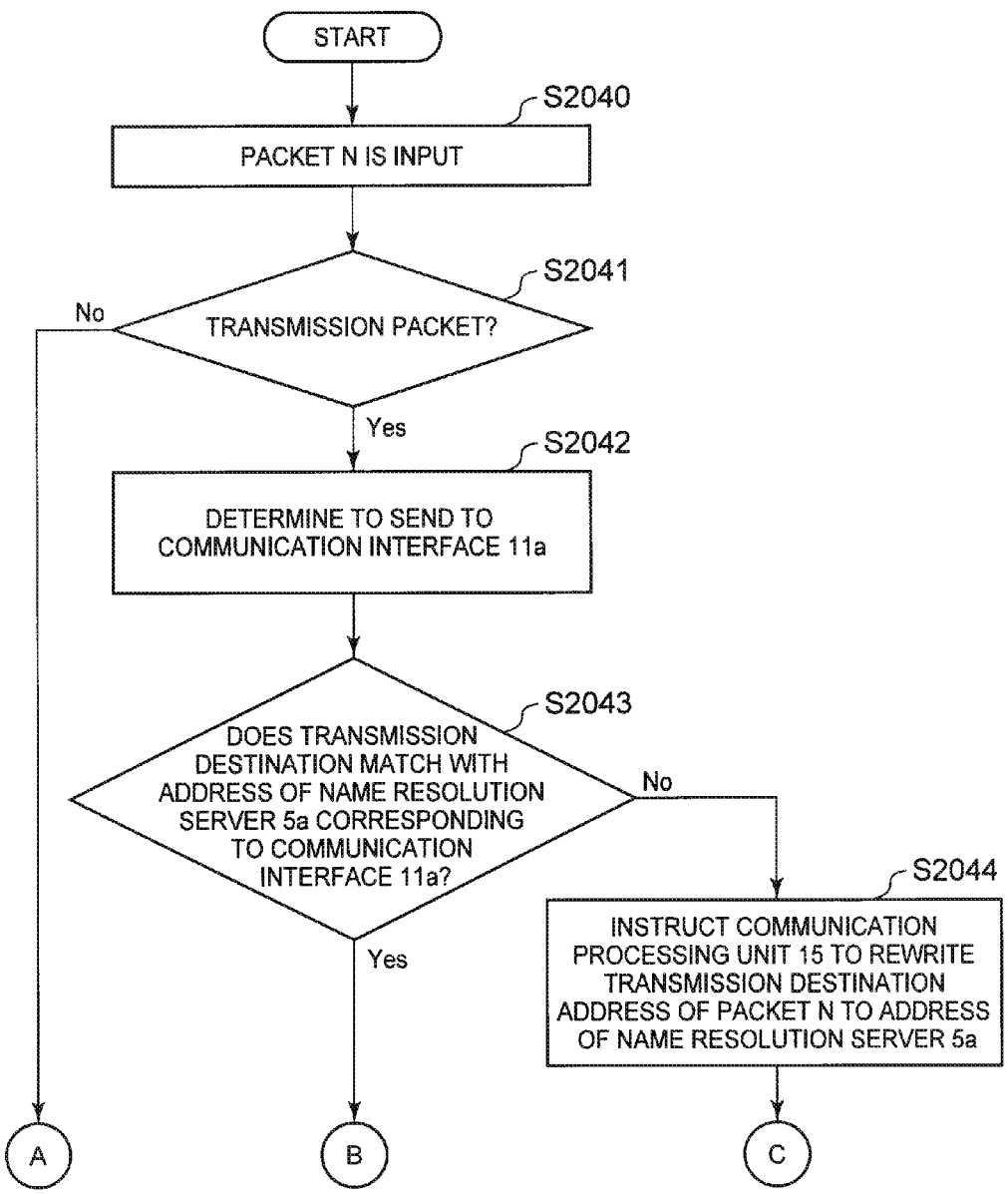
FIG. 11 It depicts a flowchart illustrating an exemplary processing progress of step S204.
Figure 12:
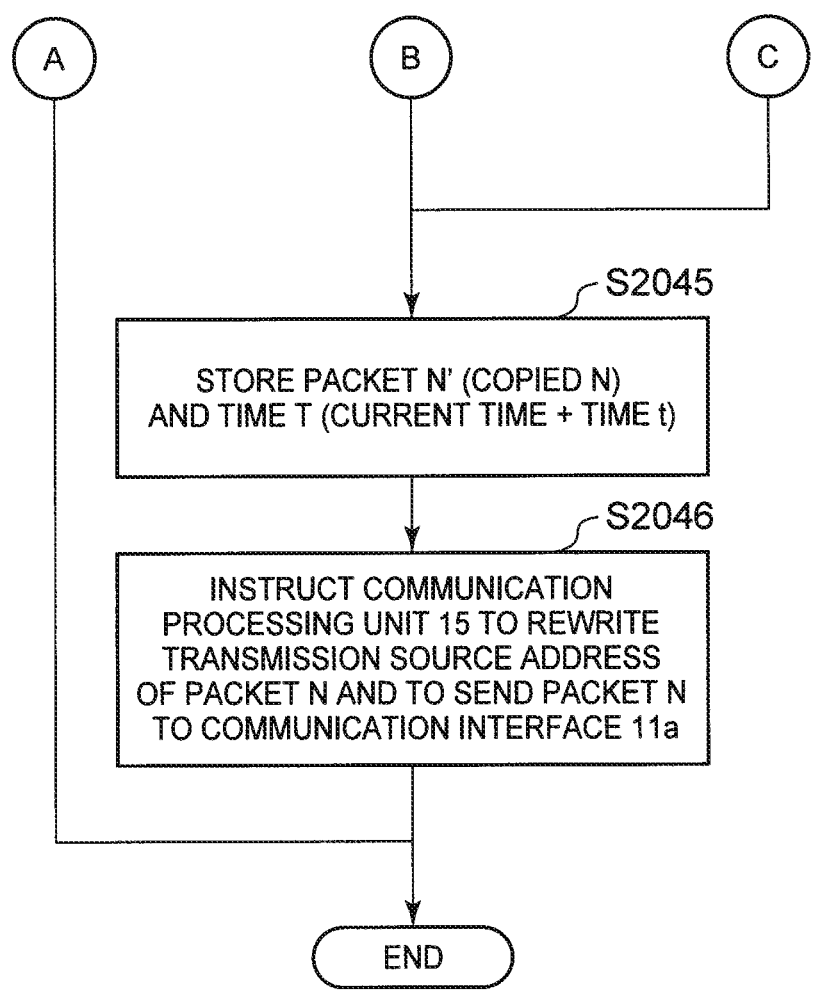
FIG. 12 It depicts a flowchart illustrating an exemplary processing progress of step S204.

When the name resolution request packet N is a transmission packet, the control unit 14 instructs the communication processing unit 15 to perform the communication processing on the name resolution request packet N (step S204). FIG. 11 and FIG. 12 are the flowcharts illustrating an exemplary processing progress of step S204.

The control unit 14 is input with the name resolution request packet N from the communication processing unit 15 (step S2040). The control unit 14 determines whether the name resolution request packet N is input from the communication software basis unit 13 into the communication processing unit 15, and determines whether the name resolution request packet N is a transmission packet (step S2041).

The method for determining whether a name resolution request packet N is input from the communication software basis unit 13 into the communication processing unit 15 is the same as the method for determining whether a packet P is input from the communication software basis unit 13 into the communication processing unit 15 according to the first exemplary embodiment.

When the name resolution request packet N is not a transmission packet (No in step S2041), the processing is terminated.

When the name resolution request packet N is a transmission packet (Yes in step S2041), the control unit 14 determines to which communication interface to send the name resolution request packet N according to the predetermined rule (step S2042). The present example will be described assuming that the name resolution request packet N is determined to be sent to the communication interface 11a.

The control unit 14 then searches the address of a name resolution server 5 corresponding to the communication interface 11a determined in step S2042 with reference to the name resolution server address storage unit 16. The control unit 14 determines whether the address matches with the transmission destination address of the name resolution request packet N (step S2043).

When the two addresses match with each other (Yes in step S2043), the processing proceeds to step S2045.

When the two addresses do not match with each other (No in step S2043), the control unit 14 instructs the communication processing unit 15 to rewrite the transmission destination address of the name resolution request packet N to the address of the name resolution server 5a corresponding to the communication interface 11a determined in step S2042 (step S2044). After step S2044, the processing proceeds to step S2045.

The processing proceeds to step S2044 when the address of the name resolution server 5 designated for the communication software basis unit 13 by the name resolution unit 17 in step S201 does not correspond to the communication interface determined by the control unit 14 in step S2042, for example.

In step S2045, the control unit 14 stores a name resolution request packet N' as a copied name resolution request packet N and stores the information on the time T in which a current time is added with the predetermined time t (step S2045).

The control unit 14 then instructs the communication processing unit 15 to rewrite the transmission source address in the header of the name resolution request packet N to the address of the communication interface 11a and to send the name resolution request packet N to the communication interface 11a (step S2046).

The communication processing unit 15 rewrites the transmission source address in the header of the name resolution request packet N to the address of the communication interface 11a and sends the name resolution request packet N to the communication interface 11a in response to the instruction from the control unit 14 (step S205). When instructed to rewrite the transmission destination address of the name resolution request packet N to the address of the name resolution server 5a in step S2044, the communication processing unit 15 rewrites the transmission destination address of the name resolution request packet N to the address of the name resolution server 5a and then sends the packet to the communication interface 11a.

The communication interface 11a outputs the name resolution request packet N input from the communication processing unit 15 to the wireless network 2a (step S206).

The wireless network 2a is available to packets, and the name resolution request packet N is transmitted to the name resolution server 5a. The name resolution server 5a then transmits the name resolution response packet M corresponding to the name resolution request packet N to the transmission source of the name resolution request packet N. Consequently, the name resolution response packet M is transmitted to the communication terminal 1 via the wireless network 2a and is received by the communication interface 11a.

The communication interface 11a sends the name resolution response packet M transmitted from the name resolution server 5a and received via the wireless network 2a to the communication processing unit 15 (step S211).

The communication processing unit 15 collates the name resolution response packet M input from the communication interface 11a with the communication processing rules, and when a communication processing rule matching with the name resolution response packet M is not present or when the name resolution response packet M matches with a communication processing rule defining packet transfer to the control unit 14, sends the name resolution response packet M to the control unit 14 (step S212). The present example will be described assuming that a communication processing rule matching with the name resolution response packet M is not present.

Figure 13:
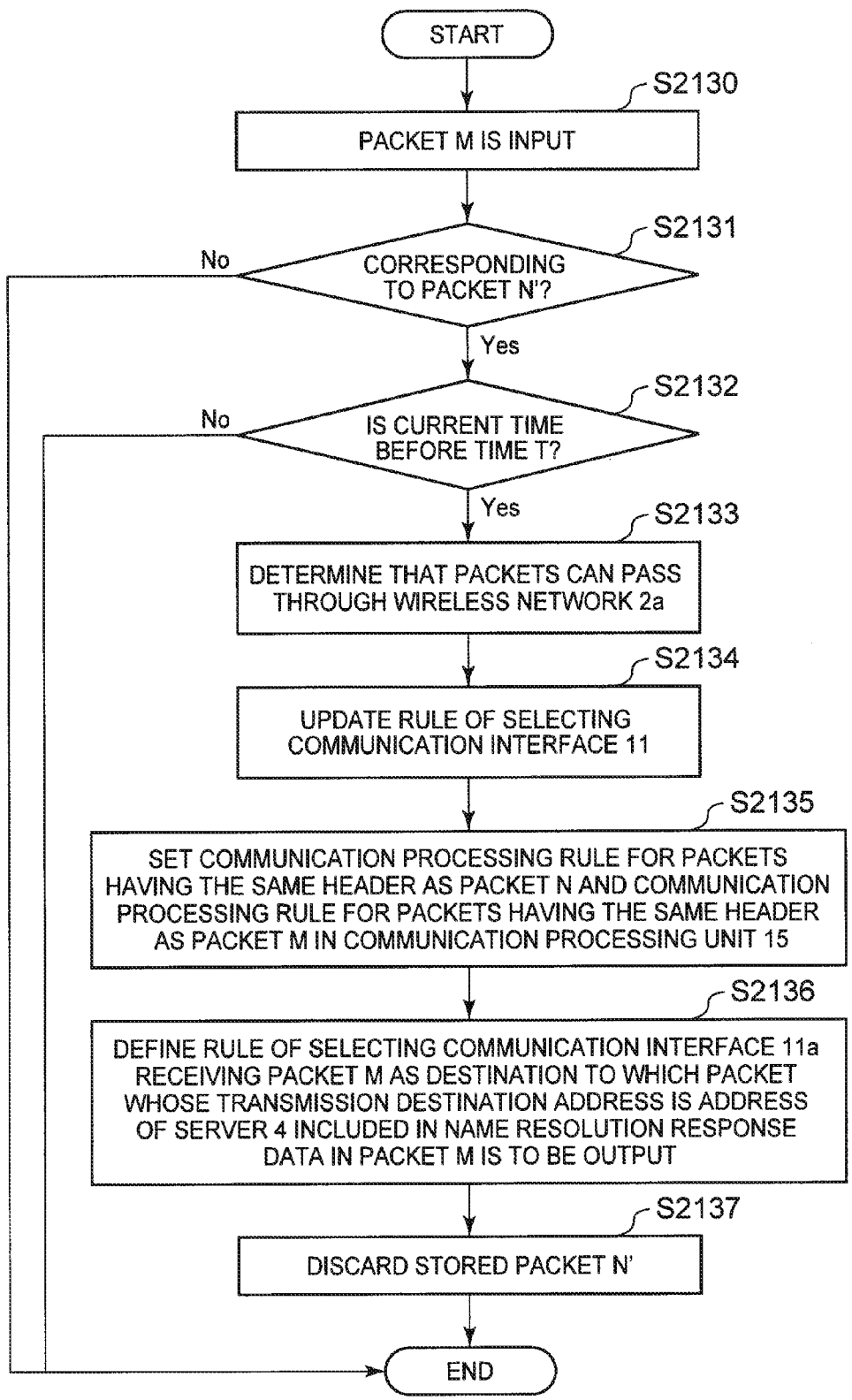
FIG. 13 It depicts a flowchart illustrating an exemplary processing progress of step S213.

The control unit 14 instructs the communication processing unit 15 to perform the processing on the name resolution response packet M (step S213). FIG. 13 is a flowchart illustrating an exemplary processing progress of step S213.

The control unit 14 is input with the name resolution response packet M from the communication processing unit 15 (step S2130). The control unit 14 determines whether the name resolution response packet M corresponds to the name resolution request packet N' (step S2131). When the condition is met in which the input packet is received by the communication interface 11a transmitting the name resolution request packet N and part of the header of the packet matches with part of the header of the stored name resolution request packet N', the control unit 14 determines that the input packet is the name resolution response packet M corresponding to the name resolution request packet N'. When the condition is not met, the control unit 14 determines that the input packet does not correspond to the name resolution request packet N'.

When the input packet does not correspond to the name resolution request packet N' (No in step S2131), the processing is terminated.

When the input packet is the name resolution response packet M corresponding to the name resolution request packet N' (Yes in step S2131), the control unit 14 determines whether a current time is before the time T (step S2132).

When the current time is after the time T (No in step S2132), the processing is terminated.

When the current time is before the time T (Yes in step S2132), the control unit 14 determines that the packet can pass through the wireless network 2a corresponding to the communication interface 11a (step S2133).

The control unit 14 then updates the rule for determining a communication interface 11 to which the packet is to be sent from the communication processing unit 15 (step S2134). The operation is the same as step S1134 according to the first exemplary embodiment.

The control unit 14 then sets, in the communication processing unit 15, a communication processing rule for packets having the same header as the name resolution request packet N (non-rewritten name resolution request packet N) and a communication processing rule for packets having the same header as the name resolution response packet M (step S2135).

The control unit 14 sets, in the communication processing unit 15, a communication processing rule of rewriting the transmission source address in the header to the address of the communication interface 11a, rewriting the transmission destination address in the header to the address of the name resolution server 5a, and sending the packet to the communication interface 11a for the packets having the same header as the name resolution request packet N.

The control unit 14 sets a communication processing rule of rewriting the transmission source address in the header to the transmission destination address of the name resolution request packet N', rewriting the transmission destination address in the header to the address of the communication processing unit 15, and sending the packet to the communication software basis unit 13 for the packets having the same header as the name resolution response packet M, for example.

The name resolution response data stored in the payload of the name resolution response packet M includes the name of the server 4 and the address of the server 4. The control unit 14 extracts the address of the server 4 included in the name resolution response data. When input with the packet including the address as the transmission destination address from the communication processing unit 15, the control unit 14 then defines a rule of selecting a communication interface 11 first receiving the name resolution response packet M as a destination to which the packet is to be sent for a certain period of time (step S2136).

The control unit 14 then discards the name resolution request packet N' stored in step S2045 (step S2137).

The communication processing unit 15 then performs the processing of rewriting the transmission source address in the header of the name resolution response packet M to the transmission destination address of the name resolution request packet N', rewriting the transmission destination address in the header to the address of the communication processing unit 15, and sending the packet to the communication software basis unit 13 according to the communication processing rule set in step S2135 (step S214).

The communication software basis unit 13 extracts the name resolution response data from the name resolution response packet M input from the communication processing unit 15 and sends it to the name resolution unit 17 (step S215). Consequently, the name resolution unit 17 acquires the name resolution response data transmitted from the name resolution sever 5a, and sends the name resolution response data to the data exchange unit 12 (step S216).

When input with the name resolution response data, the data exchange unit 12 can send the data to the communication software basis unit 13 and designate the address of a server 4. The communication software basis unit 13 then generates a packet with the address of the server 4 as the transmission destination, and sends it to the communication processing unit 15. When the packet is input from the communication processing unit 15 into the control unit 14, the control unit 14 selects the communication interface 11a according to the rule defined in step S2136. The control unit 14 then instructs the communication processing unit 15 to send the packet to the communication interface 11a. Therefore, the packet is transmitted to the server 4 via the available wireless network 2a.

Figure 14:
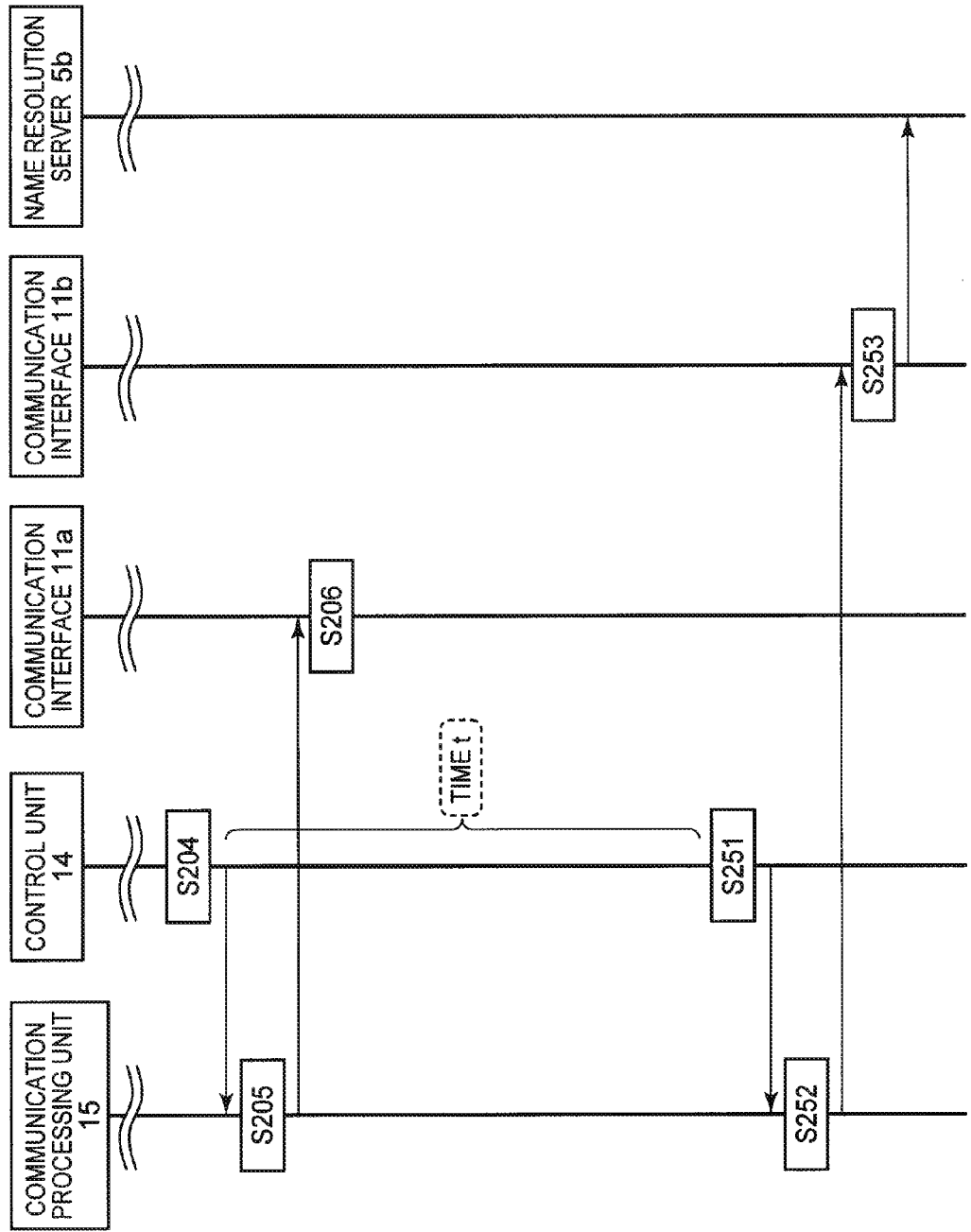
FIG. 14 It depicts a flowchart illustrating an exemplary processing progress when packets cannot pass through the wireless network 2a and packets can pass through the wireless network 2b.

FIG. 14 is a flowchart illustrating an exemplary processing progress when packets cannot pass through the wireless network 2a and packets can pass through the wireless network 2b. Steps S201 to S206 are the same as steps S201 to S206 illustrated in FIG. 10, and thus the description thereof will be omitted. Steps S201 to S203 are not illustrated in FIG. 14.

When the communication interface 11a outputs the name resolution request packet N to the wireless network 2a in step S206, the wireless network 2a is not available and thus the name resolution request packet N does not reach the name resolution server 5a. Therefore, the name resolution server 5a does not transmit the name resolution response packet M.

Figure 15:
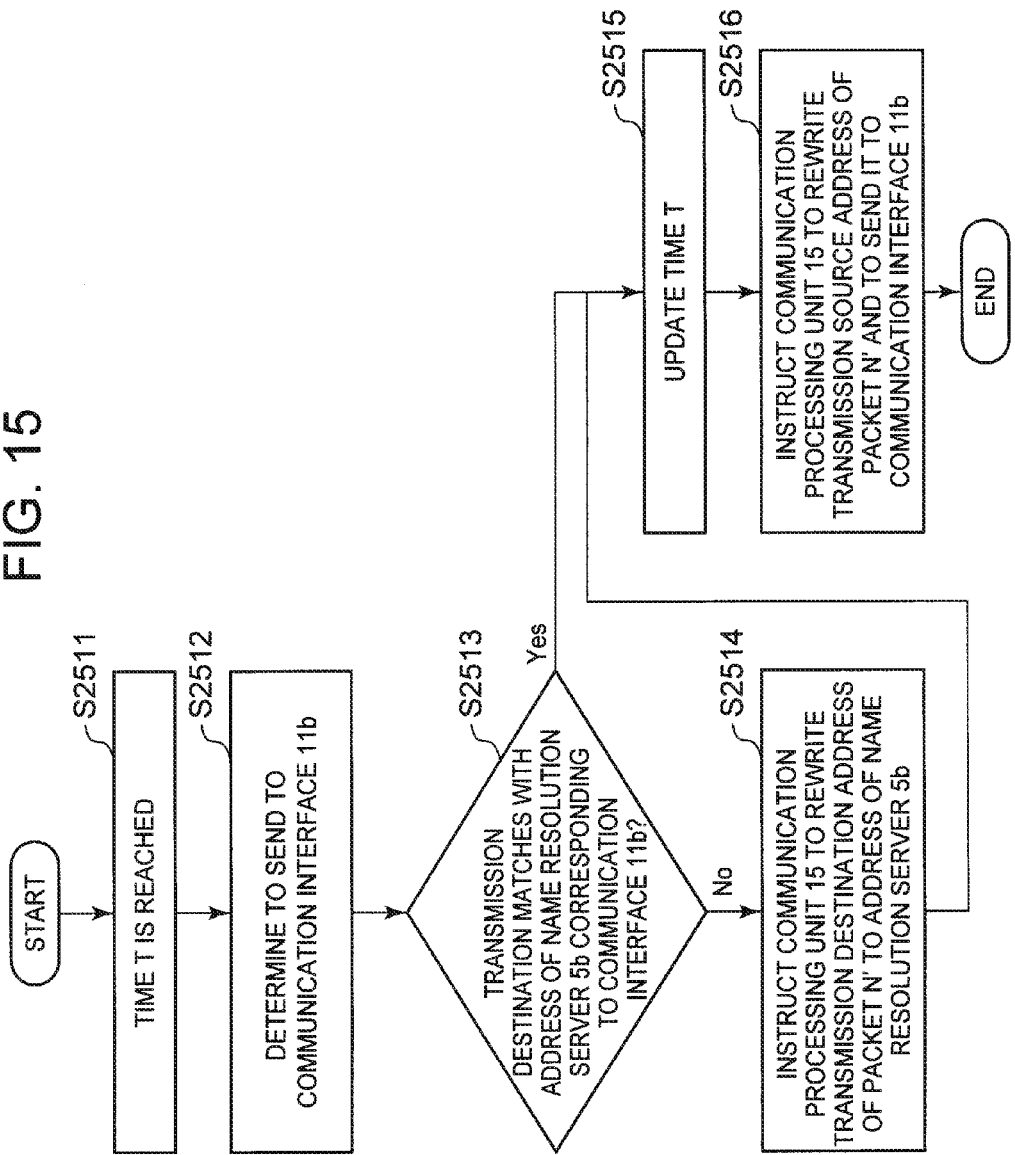
FIG. 15 It depicts a flowchart illustrating an exemplary processing progress of step S251.

When not input with the name resolution response packet M after the time T after step S204, the control unit 14 instructs the communication processing unit 15 to transmit the name resolution request packet N' from the other communication interface (step S251). FIG. 15 is a flowchart illustrating an exemplary processing progress of step S251.

The control unit 14 determines that the time T is reached before the name resolution response packet M corresponding to the name resolution request packet N' is input (step S2511).

Subsequently, the control unit 14 determines to send the name resolution request packet N' to the different communication interface 11b from the communication interface 11a determined in step S204 (more specifically, in step S2042 illustrated in FIG. 11) (step S2512).

The control unit 14 then searches the address of the name resolution server 5b corresponding to the communication interface 11b determined in step S2512 with reference to the name resolution server address storage unit 16. The control unit 14 determines whether the address of the name resolution server 5b matches with the transmission destination address of the name resolution request packet N' (step S2513).

When the two addresses match with each other (Yes in step S2513), the processing proceeds to step S2515.

When the two addresses do not match with each other (No in step S2513), the control unit 14 instructs the communication processing unit 15 to rewrite the transmission destination address of the name resolution request packet N' to the address of the name resolution server 5b corresponding to the communication interface 11b determined in step S2512 (step S2514). After step S2514, the processing proceeds to step S2515.

In step S2515, the control unit 14 updates the time T defined in step S2045 (see FIG. 12) (step S2515). The processing in step S2515 is the same as the processing in step S1513 according to the first exemplary embodiment.

The control unit 14 then instructs the communication processing unit 15 to rewrite the transmission source address in the header of the name resolution request packet N' to the address of the communication interface 11b determined in step S2512 and to send the name resolution request packet N' to the communication interface 11b (step S2516).

The communication processing unit 15 rewrites the transmission source address in the header of the name resolution request packet N' to the address of the communication interface 11b, and sends the name resolution request packet N' to the communication interface 11b in response to the instruction from the control unit 14 (step S252). Further, when instructed to rewrite the transmission destination address of the name resolution request packet N' to the address of the name resolution server 5b in step S2514, the communication processing unit 15 rewrites the transmission destination address of the name resolution request packet N' to the address of the name resolution server 5b and then sends the packet to the communication interface 11b in response to the instruction.

The communication interface 11b outputs the name resolution request packet N' input from the communication processing unit 15 to the wireless network 2b (step S253).

The wireless network 2b is available to packets, and the name resolution request packet N' is transmitted to the name resolution server 5b. The name resolution server 5b then transmits the name resolution response packet M corresponding to the name resolution request packet N' to the transmission source of the name resolution request packet N'. Consequently, the name resolution response packet M is transmitted to the communication terminal 1 via the wireless network 2b and is received by the communication interface 11b.

The operations when the communication interface 11b receives the name resolution response packet M are the same as the operations in steps S211 to S216, and thus the description thereof will be omitted.

According to the present exemplary embodiment, a wireless network through which packets can pass can be determined by use of a name resolution request packet including actual data (name resolution request data) and its response packet (name resolution response packet). Therefore, as in the first exemplary embodiment, a wireless network 2 through which packets can pass can be determined without the use of a route determination dedicated packet, thereby preventing communication efficiency or power efficiency from being deteriorated.

According to the present exemplary embodiment, it is possible to determine a wireless network through which packets can pass in the pre-processing before the data exchange unit 12 and the server 4 exchange data with each other.

Third Exemplary Embodiment

Figure 16:
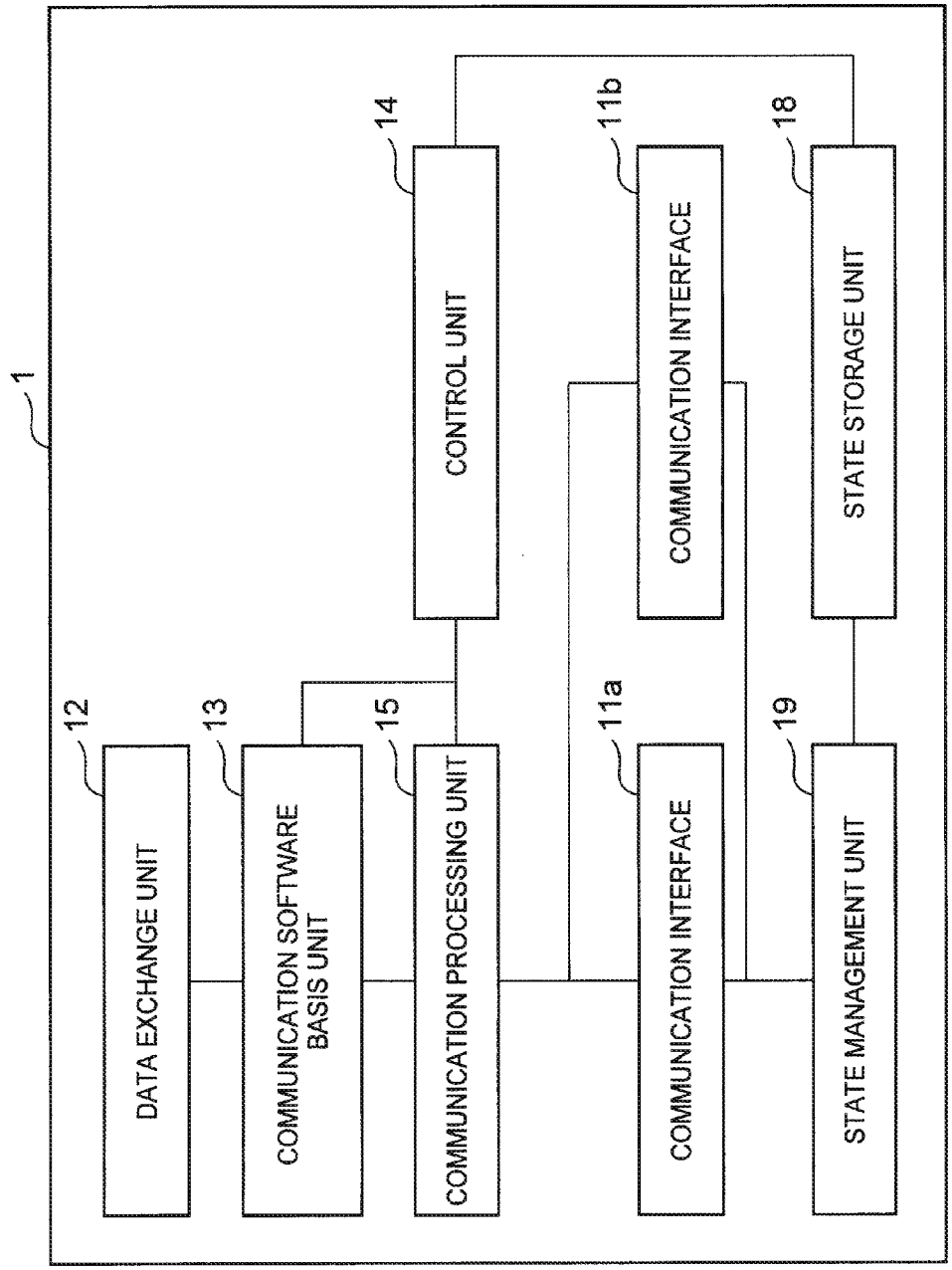
FIG. 16 It depicts a block diagram illustrating an exemplary structure of a communication terminal according to a third exemplary embodiment of the present invention.

FIG. 16 is a block diagram illustrating an exemplary structure of a communication terminal according to a third exemplary embodiment of the present invention. The communication terminal 1 according to the third exemplary embodiment is such that the communication terminal 1 according to the first exemplary embodiment (see FIG. 2) is added with a state storage unit 18 and a state management unit 19. The state storage unit 18 is connected to the control unit 14 and the state management unit 19. The state management unit 19 is connected to the respective communication interfaces 11 in addition to the state storage unit 18.

The state storage unit 18 is a storage device for storing state information on the respective communication interfaces 11. Specifically, the state storage unit 18 stores the state information on the communication interfaces 11, such as information on whether a communication interface is enabled or disabled, and a truth value of the sleep state.

The state management unit 19 grasps the states of the communication interfaces 11, and stores the state information on the communication interfaces 11 in the state storage unit 18.

The state management unit 19 is realized by the CPU in the computer operating according to the program, for example. For example, the CPU reads the program from the program storage device (not illustrated), and may operate as the state management unit 19 according to the program.

According to the present exemplary embodiment, when the state of each communication interface 11 changes, the communication interface 11 indirectly or directly notifies the state management unit 18 of its state information.

The control unit 14 according to the present exemplary embodiment performs the following operations in addition to the operations according to the first exemplary embodiment. The control unit 14 reads the state information on the communication interfaces 11 from the state storage unit 18. The control unit 14 then uses the state information when determining a communication interface 11 to which a packet is to be sent from the communication processing unit 15. For example, the control unit 14 may select the communication interface 11a when the communication interface 11a is enabled, but does not select the communication interface 11a when the communication interface 11a is disabled. Further, the control unit 14 may use information other than the state information on the communication interfaces 11 when determining a communication interface 11 to which a packet is to be sent from the communication processing unit 15. The present exemplary embodiment will be described assuming that the communication interface 11a is enabled.

The control unit 14 determines the time t used for determining the time T as a timeout determination reference (or the time t corresponding to an elapsed time from a current time to the time T). At this time, the control unit 14 uses the state information on the communication interfaces 11. For example, when a communication interface 11 is in the sleep state, the control unit 14 determines, as the time t, a result in which a time required to wake up the communication interface 11 is added with the default value of the time t. The time required to wake up the communication interface 11 may be defined depending on the type of the communication interface 11 or the type of a corresponding wireless network, for example. Alternatively, the control unit 14 may calculate the time required to wake up the communication interface 11 based on the past history. Alternatively, the control unit 14 may calculate the time required to wake up by an algorithm using the type of the communication interface 11, the type of the corresponding wireless network, the position of the communication terminal 1, time, and the like.

A processing progress of the third exemplary embodiment will be described below.

Figure 17:
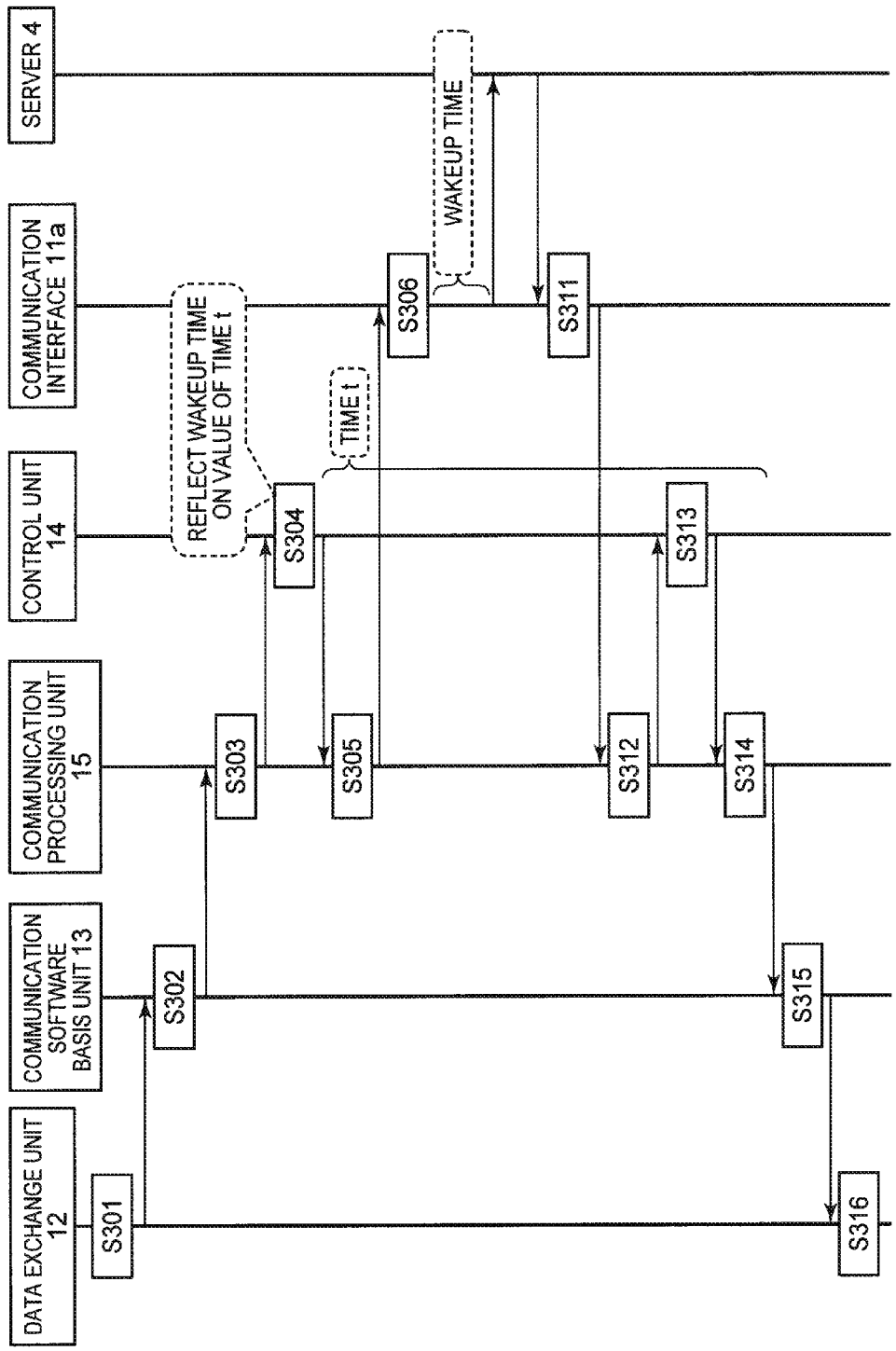
FIG. 17 It depicts a flowchart illustrating an exemplary processing progress of the third exemplary embodiment.

FIG. 17 is a flowchart illustrating an exemplary processing progress of the third exemplary embodiment. Steps S301 to S303 are the same as steps S101 to S103 according to the first exemplary embodiment, and thus the description thereof will be omitted.

Figure 18:
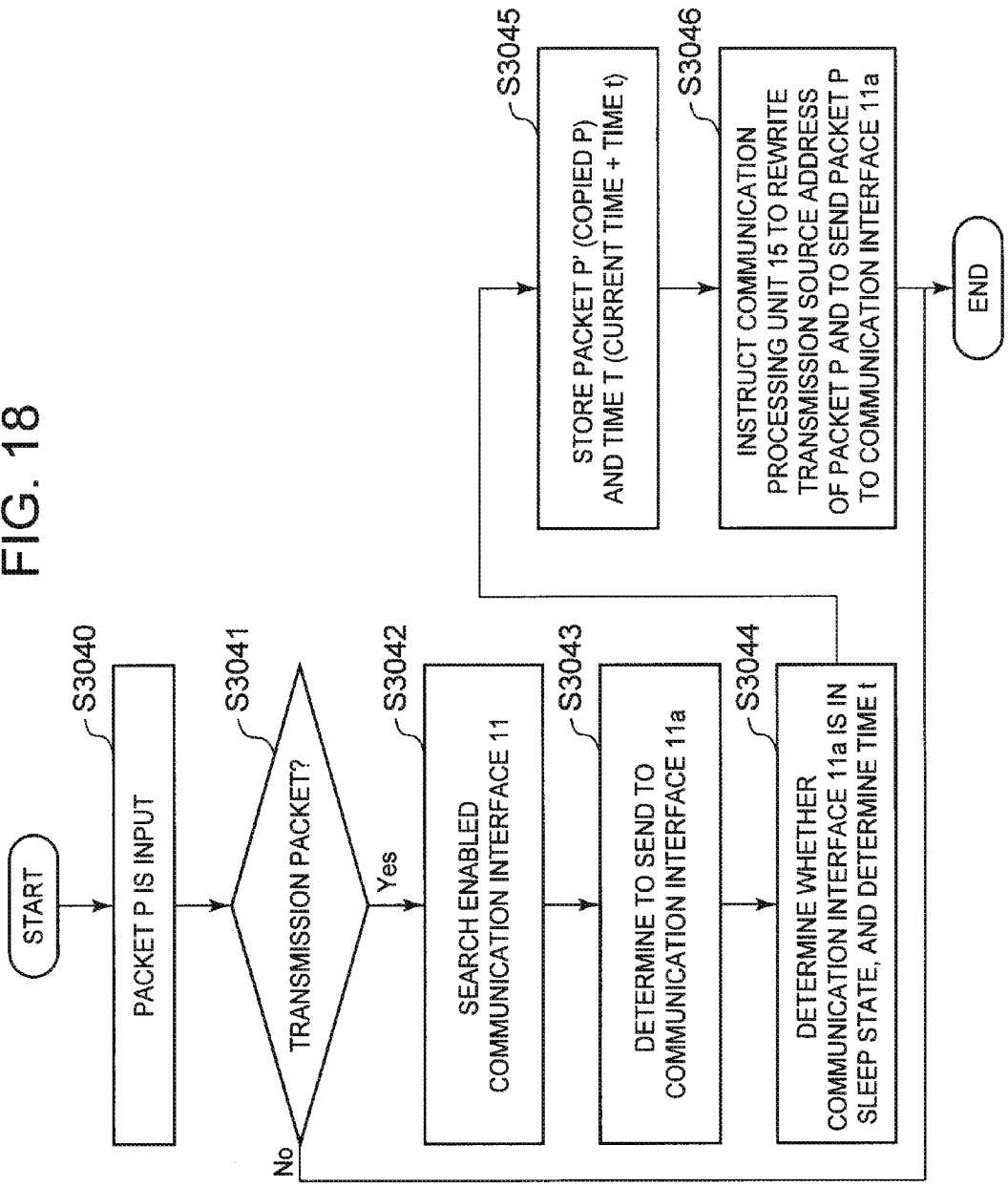
FIG. 18 It depicts a flowchart illustrating an exemplary processing progress of step S304.

When the packet P is input from the communication processing unit 15 into the control unit 14, the control unit 14 instructs the communication processing unit 15 to perform the communication processing on the packet P (step S304). FIG. 18 is a flowchart illustrating an exemplary processing progress of step S304.

The control unit 14 is input with the packet P from the communication processing unit 15 (step S3040). The control unit 14 determines whether the packet P is input from the communication software basis unit 13 into the communication processing unit 15, and determines whether the packet P is a transmission packet (step S3041). Step S3041 is the same as step S1041 according to the first exemplary embodiment.

When the packet P is not a transmission packet (No in step S3041), the processing is terminated.

When the packet P is a transmission packet (Yes in step S3041), the control unit 14 searches an enabled communication interface with reference to the state information stored in the state storage unit 18 (step 3042).

The control unit 14 then determines a communication interface 11 to which the packet is to be sent from the communication processing unit 15 out of the enabled communication interfaces 11 (step S3043). For example, the control unit 14 determines a communication interface 11 with the highest selection priority defined according to the previously-defined predetermined rule out of the enabled communication interfaces 11. The present example assumes that the communication interface 11a is determined as a destination to which the packet is to be sent in step S3043.

The control unit 14 then determines whether the communication interface 11a determined as a destination to which the packet is to be sent from the communication processing unit 15 is in the sleep state, and then determines the time t used for determining the time T (step S3044). The control unit 14 determines whether the communication interface 11a is in the sleep state with reference to the state information stored in the state storage unit 18. When the communication interface 11a is in the sleep state, the control unit 14 determines, as the time t, a result in which a time required to wake up the communication interface 11a is added with the default value of the time t. When the communication interface 11a is not in the sleep state, the control unit 14 uses the default value of the time t as the time t.

Subsequently, the control unit 14 stores a packet P' as a copied packet P. Further, the control unit 14 stores the information on the time T in which a current time is added with the time t determined in step S3044 (step S3045).

The control unit 14 then instructs the communication processing unit 15 to rewrite the transmission source address in the header of the packet P to the address of the communication interface 11a, and to send the packet P to the communication interface 11a (step S3046). Step S3046 is the same as step S1044 according to the first exemplary embodiment.

The communication processing unit 15 rewrites the transmission source address in the header of the packet P to the address of the communication interface 11a and sends the packet P to the communication interface 11a in response to the instruction from the control unit 14 (step S305). Step S305 is the same as step S105 according to the first exemplary embodiment.

The communication interface 11a then releases the sleep state by the wakeup operation, and then outputs the packet P to the wireless network 2a (step S306).

The subsequent operations (steps S311 to S316) are the same as steps S111 to S116 (see FIG. 3) according to the first exemplary embodiment, and thus the description thereof will be omitted.

The same effects can be obtained also in the present exemplary embodiment as in the first exemplary embodiment.

The third exemplary embodiment may be applied to the second exemplary embodiment.

Figure 19:
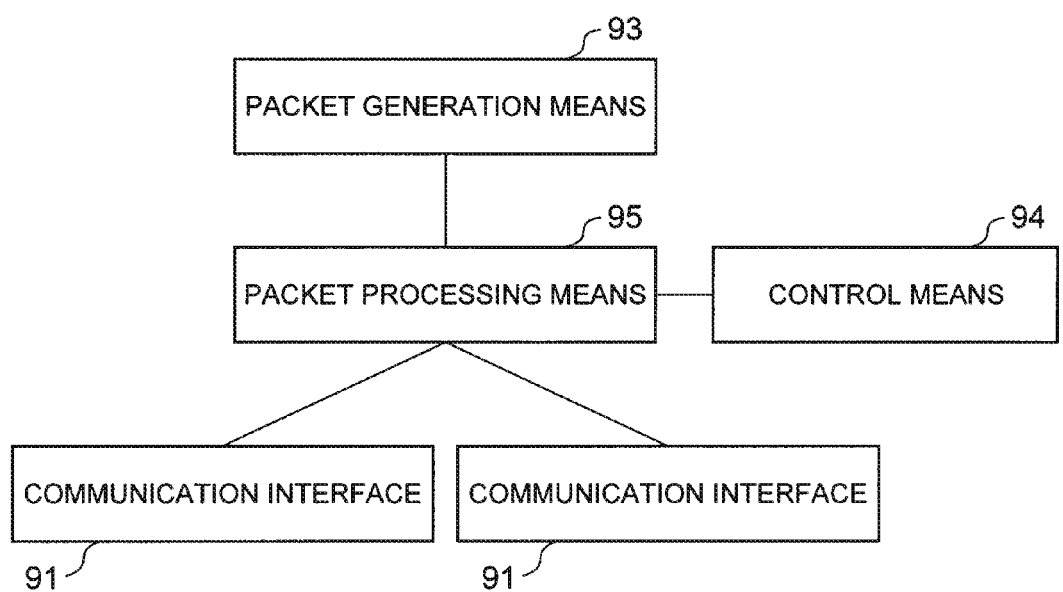
FIG. 19 It depicts a block diagram illustrating main components in a communication terminal according to the present invention.

Main components according to the present invention will be described below. FIG. 19 is a block diagram illustrating main components in a communication terminal according to the present invention. The communication terminal according to the present invention includes a plurality of communication interfaces 91 (the communication interfaces 11, for example) corresponding to at least one wireless network among a plurality of wireless networks. The communication terminal further includes a packet generation means 93, a packet processing means 95, and a control means 94.

The packet generation means 93 (the communication software basis unit 13, for example) generates a packet based on data for receiving a service from a destination device (such as server 4 or name resolution server 5).

The packet processing means 95 (the communication processing unit 15, for example) sends the packet to a designated communication interface.

The control means 94 (the control unit 14, for example) selects one communication interface 91 from among the communication interfaces 91, instructs the packet processing means 95 to send the packet generated by the packet generation means 93 to the communication interface 91, and when a response packet for the packet is not input until a timeout determination reference time (such as time T), selects a different communication interface 91 from the communication interface 91, instructs the packet processing means 95 to send a copied packet to the communication interface 91.

With the structure, it is possible to select a communication interface corresponding to a communicable wireless network without the use of a route determination dedicated packet.

Some or all of the exemplary embodiments can be described as in the following notes, but are not limited to the following notes.

(Supplementary note 1) A communication terminal including a plurality of communication interfaces (the communication interfaces 11, for example) each corresponding to at least one wireless network among a plurality of wireless networks, a packet generation means (the communication software basis unit 13, for example) for generating a packet based on data for receiving a service from a destination device (such as server 4 or name resolution server 5), a packet processing means (the communication processing unit 15, for example) for sending a packet to a designated communication interface, and a control means (the control unit 14, for example) for selecting a communication interface from among the communication interfaces, instructing the packet processing means to send a packet generated by the packet generation means to the communication interface, and when a response packet for the packet is not input until a timeout determination reference time (such as the time T), selecting a different communication interface from the communication interface, instructing the packet processing means to send a copy of the packet to the communication interface.

(Supplementary note 2) The communication terminal according to supplementary note 1, wherein the packet generation means generates a packet whose transmission source is the address of the packet processing means, and the control means instructs the packet processing means to rewrite the transmission source address of the packet to the address of a selected communication interface.

(Supplementary note 3) The communication terminal according to supplementary note 1 or supplementary note 2, including a name resolution server selection means (the name resolution unit 17, for example) for selecting a name resolution server from among a plurality of name resolution servers and designating the selected name resolution server for the packet generation means, and a correspondence storage means (the name resolution server address storage unit 16, for example) for storing a correspondence between the addresses of the name resolution servers and the communication interfaces, wherein the packet generation means generates a packet (such as name resolution request packet) whose transmission destination address is the address of a name resolution server designated by the name resolution server selection means based on a device name (the name of the server 4, for example) to be resolved, and the control means instructs the packet processing means to rewrite the transmission destination address of a packet to the address of a name resolution server corresponding to a selected communication interface when the transmission destination address of the packet generated by the packet generation means does not match with the address of the name resolution server corresponding to the selected communication interface.

(Supplementary note 4) The communication terminal according to supplementary note 3, wherein when a response packet (such as name resolution response packet) for the packet output from the selected communication interface is transmitted from the name resolution server, the control means extracts the address of the device (the address of the server 4, for example) whose name is to be resolved included in the response packet, and selects the communication interface receiving the response packet when a packet whose transmission destination address is the address is generated.

(Supplementary note 5) The communication terminal according to any one of supplementary note 1 to supplementary note 4, including a state storage means (the state storage unit 18, for example) for storing state information on states of the communication interfaces, and a state management means (the state management unit 19, for example) for storing the state information in the state storage means, wherein when selecting a communication interface, the control means determines a timeout determination reference time based on the state of the communication interface.

(Supplementary note 6) The communication terminal according to any one of supplementary note 1 to supplementary note 5, wherein the control means selects a communication interface according to a rule, instructs the packet processing means to send a packet generated by the packet generation means to the communication interface, and when a response packet for the packet is input until a timeout determination reference time, updates the rule.

(Supplementary note 7) A communication method applied to a communication terminal including a plurality of communication interfaces (the communication interfaces 11, for example) each corresponding to at least one wireless network among a plurality of wireless networks, wherein a packet generation means (the communication software basis unit 13, for example) generates a packet based on data for receiving a service from a destination device (such as server 4 or name resolution server 5), a control means (the control unit 14, for example) selects a communication interface from among the communication interfaces, instructs a packet processing means to send a packet generated by the packet generation means to the communication interface, and when a response packet for the packet is not input until a timeout determination reference time (such as the time T), selects a different communication interface from the communication interface, instructs the packet processing means to send a copy of the packet to the communication interface, and the packet processing means (the communication processing unit 15, for example) sends the packet to the communication interface selected by the control means in response to the instruction of the control means.

(Supplementary note 8) The communication method according to supplementary note 7, wherein the packet generation means generates a packet whose transmission source is the address of the packet processing means, and the control means instructs the packet processing means to rewrite the transmission source address of the packet to the address of the selected communication interface.

(Supplementary note 9) The communication method according to supplementary note 7 or supplementary note 8, wherein the correspondence storage means (the name resolution server address storage unit 16, for example) stores a correspondence between the addresses of the name resolution servers and the communication interfaces, the name resolution server selection means (the name resolution unit 17, for example) selects a name resolution server from among the name resolution servers and designates the selected name resolution server for the packet generation means, the packet generation means generates a packet (such as name resolution request packet) whose transmission destination address is the address of a name resolution server designated by the name resolution server selection means based on a device name (such as the name of the server 4) to be resolved, and when the transmission destination address of a packet generated by the packet generation means does not match with the address of a name resolution server corresponding to a selected communication interface, the control means instructs the packet processing means to rewrite the transmission destination address of the packet to the address of the name resolution server corresponding to the selected communication interface.

(Supplementary note 10) The communication method according to supplementary note 9, wherein the control means extracts the address of a device (such as the address of the server 4) to be resolved included in a response packet (such as name resolution response packet) when the response packet for the packet output from the selected communication interface is transmitted from the name resolution server, and selects the communication interface receiving the response packet when a packet whose transmission destination address is the address is generated.

(Supplementary note 11) The communication method according to any one of supplementary note 7 to supplementary note 10, wherein the state management means (the state management unit 19, for example) stores state information on states of the communication interfaces in the state storage means (the state storage unit 18, for example), and when selecting a communication interface, the control means determines a timeout determination reference time based on the state of the communication interface.

(Supplementary note 12) The communication method according to any one of supplementary note 7 to supplementary note 11, wherein the control means selects a communication interface according to a rule, instructs the packet processing means to send a packet generated by the packet generation means to the communication interface, and when a response packet for the packet is input until a timeout determination reference time, updates the rule.

(Supplementary note 13) A communication program mounted on a computer including communication interfaces (the communication interfaces 11, for example) each corresponding to at least one wireless network among a plurality of wireless networks, and a packet processing means (the communication processing unit 15, for example) for sending a packet to a designated communication interface, the program for causing the computer to perform a packet generation processing of generating a packet based on data for receiving a service from a destination device (such as server 4 or name resolution server 5), and a control processing of selecting a communication interface from among the communication interfaces, instructing the packet processing means to send a packet generated in the packet generation processing to the communication interface, and when a response packet for the packet is not input until a timeout determination reference time (such as the time T), selecting a different communication interface from the communication interface, instructing the packet processing means to send a copy of the packet to the communication interface.

(Supplementary note 14) The communication program according to supplementary note 13, causes the computer to perform: in the packet generation processing, generating a packet whose transmission source is the address of the packet processing means; and in the control processing, instructing the packet processing means to rewrite the transmission source address of the packet to the address of the selected communication interface.

(Supplementary note 15) The communication program according to supplementary note 13 or supplementary note 14, causing a computer including the correspondence storage means (the name resolution server address storage unit 16, for example) for storing a correspondence between the addresses of the name resolution servers and the communication interfaces to perform a name resolution server selection processing of selecting a name resolution server from among the name resolution servers, in the packet generation processing, generating a packet (such as name resolution request packet) whose transmission destination address is the address of a name resolution server selected in the name resolution server selection processing based on a device name (such as the name of the server 4) to be resolved, and in the control processing, when the transmission destination address of a packet generated in the packet generation processing does not match with the address of a name resolution server corresponding to a selected communication interface, instructing the packet processing means to rewrite the transmission destination address of the packet to the address of the name resolution server corresponding to the selected communication interface.

(Supplementary note 16) The communication program according to supplementary note 15, causing a computer to perform in the control processing, when a response packet (such as name resolution response packet) for the packet output from the selected communication interface is transmitted from the name resolution server, extracting the address of a device (such as the address of the server 4) to be resolved included in the response packet, and when a packet whose transmission destination address is the address is generated, selecting the communication interface receiving the response packet.

(Supplementary note 17) The communication program according to any one of supplementary note 13 to supplementary note 16, causing a computer including the state storage means (the state storage unit 18, for example) for storing state information on states of the communication interfaces to perform a state management processing of storing the state information on the states of the communication interfaces in the state storage means, and a control processing of, when selecting a communication interface, determining a timeout determination reference time based on the state of the communication interface.

(Supplementary note 18) The communication program according to any one of supplementary note 13 to supplementary note 17, causing a computer to perform in the control processing, selecting a communication interface according to a rule, instructing the packet generation means to send a packet generated in the packet generation processing to the communication interface, and when a response packet for the packet is input until a timeout determination reference time, updating the rule.

The present invention has been described with reference to the exemplary embodiments, but the present invention is not limited to the exemplary embodiments. The structure or details of the present invention can be variously changed within the scope of the present invention understandable to those skilled in the art.

The present application claims the priority based on Japanese Patent Application No. 2013-252663 filed on Dec. 6, 2013, the disclosure of which is all incorporated herein by reference.

INDUSTRIAL APPLICABILITY

The present invention is suitably applied to communication terminals capable of being connected to a plurality of wireless networks.

REFERENCE SIGNS LIST

1 Communication terminal
11a, 11b Communication interface
12 Data exchange unit
13 Communication software basis unit
14 Control unit
15 Communication processing unit
16 Name resolution server address storage unit
17 Name resolution unit
18 State storage unit
19 State management unit

What is claimed is:

1. A communication terminal comprising:
   a plurality of communication interfaces each corresponding to at least one wireless network among a plurality of wireless networks;
   a packet generation unit which forms a packet based on data for receiving a service from a destination device;
   a packet processing unit which sends the packet to a designated communication interface;
   a control unit which selects a communication interface from among the communication interfaces, instructs the packet processing unit to send the packet formed by the packet generation unit to the communication interface, and when a response packet for the packet is not input until a timeout determination reference time, selects a different communication interface from the communication interface, and instructs the packet processing unit to send a copy of the packet to the communication interface;
   a name resolution server selection unit which selects a name resolution server from among a plurality of name resolution servers and designates the selected name resolution server for the packet generation unit; and
   a correspondence storage unit which stores a correspondence between addresses of the name resolution servers and the communication interfaces,
   wherein the packet generation unit forms the packet whose transmission destination address is the address of a name resolution server designated by the name resolution server selection unit, based on a device name to be resolved, and
   the control unit instructs the packet processing unit to rewrite the transmission destination address of the packet to the address of the name resolution server corresponding to the selected communication interface when the transmission destination address of the packet formed by the packet generation unit does not match with the address of the name resolution server corresponding to the selected communication interface.

2. The communication terminal according to claim 1,
   wherein the packet generation unit forms the packet whose transmission source is the address of the packet processing unit, and
   the control unit instructs the packet processing unit to rewrite the transmission source address of the packet to the address of the selected communication interface.

3. The communication terminal according to claim 1,
   wherein when the response packet for the packet output from the selected communication interface is transmitted from the name resolution server, the control unit extracts the address of the device whose name is to be resolved included in the response packet, and selects the communication interface receiving the response packet when the packet whose transmission destination address is the address is formed.

4. The communication terminal according to claim 1, further comprising:
   a state storage unit which stores state information on states of the communication interfaces; and
   a state management unit which stores the state information in the state storage unit,
   wherein when selecting a communication interface, the control unit determines a timeout determination reference time based on the state of the communication interface.

5. The communication terminal according to claim 1, wherein the control unit selects a communication interface according to a rule, instructs the packet processing unit to send generated the packet formed by the packet generation unit to the communication interface, and when the response packet for the packet is input until a timeout determination reference time, updates the rule.

6. A communication method applied to a communication terminal comprising a plurality of communication interfaces each corresponding to at least one wireless network among a plurality of wireless networks, the communication method comprising:
   forming a packet based on data for receiving a service from a destination device,
   selecting a communication interface from among the communication interfaces, instructing a packet processing unit to send the formed packet to the communication interface,
   when a response packet for the packet is not input until a timeout determination reference time, selecting a different communication interface from the communication interface, and instructing the packet processing unit to send a copy of the packet to the communication interface, and
   sending, by the packet processing unit, the packet to the selected communication interface in response to the instruction,
   the communication method further comprising:
   selecting a name resolution server from among a plurality of name resolution servers, forming the packet whose transmission destination address is an address of the selected name resolution server, based on a device name to be resolved, determining whether the transmission destination address of the formed packet matches with the address of the name resolution server corresponding to the selected communication interface, by reference to a correspondence storage unit which stores a correspondence between the addresses of the name resolution servers and the communication interfaces, and rewriting the transmission destination address of the packet to the address of the name resolution server corresponding to the selected communication interface when the transmission destination address of the formed packet does not match with the address of the name resolution server corresponding to the selected communication interface.

7. The communication method according to claim 6, forming the packet whose transmission source is the address of the packet processing unit, and instructing the packet processing unit to rewrite the transmission source address of the packet to the address of the selected communication interface.

8. A non-transitory computer readable recording medium in which a communication program is recorded, the program is mounted on a computer comprising communication interfaces each corresponding to at least one wireless network among a plurality of wireless networks, and a packet processing unit sending a packet to a designated communication interface, the program causing the computer to perform:

forming the packet based on data for receiving a service from a destination device;

selecting a communication interface from among the communication interfaces;

instructing the packet processing unit to send the formed packet to the communication interface, and when a response packet for the packet is not input until a timeout determination reference time, selecting a different communication interface from the communication interface, and instructing the packet processing unit to send a copy of the packet to the communication interface, and sending, by the packet processing unit, the packet to the selected communication interface in response to the instruction, the program further causing the computer to perform:

selecting a name resolution server from among a plurality of name resolution servers, forming the packet whose transmission destination address is an address of the selected name resolution server, based on a device name to be resolved, determining whether the transmission destination address of the formed packet matches with the address of the name resolution server corresponding to the selected communication interface, by reference to a correspondence storage unit which stores a correspondence between the addresses of the name resolution servers and the communication interfaces, and rewriting the transmission destination address of the packet to the address of the name resolution server corresponding to the selected communication interface when the transmission destination address of the formed packet does not match with the address of the name resolution server corresponding to the selected communication interface.

9. The non-transitory computer readable recording medium in which the communication program is recorded, according to claim 8, the program causing the computer to perform:

forming the packet whose transmission source is the address of the packet processing unit; and instructing the packet processing unit to rewrite the transmission source address of the packet to the address of the selected communication interface.

* * * * *